(12) United States Patent
Deforche

(10) Patent No.: US 7,349,405 B2
(45) Date of Patent: Mar. 25, 2008

(54) METHOD AND APPARATUS FOR FAIR QUEUEING OF DATA PACKETS

(75) Inventor: Koen Deforche, Roeselare (BE)

(73) Assignee: TranSwitch Corporation, Shelton, CT (US)

( * ) Notice: Subject to any disclaimer, the term of this patent is extended or adjusted under 35 U.S.C. 154(b) by 945 days.

(21) Appl. No.: 10/601,517

(22) Filed: Jun. 23, 2003

(65) Prior Publication Data

US 2004/0258072 A1    Dec. 23, 2004

(51) Int. Cl.
*H04L 12/28* (2006.01)
*H04L 12/56* (2006.01)

(52) U.S. Cl. ............... 370/395.4; 370/412; 370/468; 370/235

(58) Field of Classification Search .......... None
See application file for complete search history.

(56) References Cited

U.S. PATENT DOCUMENTS

| | | | |
|---|---|---|---|
| 6,747,976 B1 * | 6/2004 | Bensaou et al. | 370/395.4 |
| 7,061,918 B2 * | 6/2006 | Duckering et al. | 370/395.4 |
| 7,065,762 B1 * | 6/2006 | Duda et al. | 718/102 |
| 2003/0050954 A1 * | 3/2003 | Tayyar et al. | 709/102 |
| 2003/0179774 A1 * | 9/2003 | Saidi et al. | 370/468 |
| 2004/0085964 A1 * | 5/2004 | Vaananen | 370/395.4 |
| 2004/0114602 A1 * | 6/2004 | Ko et al. | 370/395.4 |
| 2004/0151197 A1 * | 8/2004 | Hui | 370/412 |
| 2004/0160961 A1 * | 8/2004 | Duckering et al. | 370/395.4 |
| 2007/0050773 A1 * | 3/2007 | Tayyar et al. | 718/102 |

OTHER PUBLICATIONS

"Start-Time Fair Queueing: A Scheduling Algorithm for Integrated Services Packet Switching Networks", by Pawan Goyal, Harrick M. Vin, and Haichen Cheng. vol. 5, No. 5, Oct. 1997, IEEE.
"A Self-Clocked Fair Queueing Scheme for Broadband Applications", by S. Jamaloddin Golestani, Belicore, 1994 IEEE.

(Continued)

*Primary Examiner*—Chirag G. Shah
(74) *Attorney, Agent, or Firm*—Gordon & Jacobson, PC

(57) ABSTRACT

A packet scheduling method and apparatus is described for enqueuing incoming data packets in sessions, and for storing the sessions in sequential order in service-groups. Each service-group is assigned a nominal service-interval in which time a data packet is to be transmitted, the nominal service-interval of one service-group being faster than the nominal service-interval of another service-group. Within one service-group, one session is serviced until the nominal service-interval of any of the service-groups where there is at least one data packet to be sent is exceeded.

4 Claims, 34 Drawing Sheets

OTHER PUBLICATIONS

"Analysis and Simulation of a Fair Queueing Algorithm" by Alan Demers, Srinivasan Keshav, Scott Shenker, Computer Communications Review vol. 19, No. 4, Austin TX Sep. 1989, pp. 1-12.

"Virtual Clock: A New Traffic Control Algorithm for Packet Switching Networks" by Lixia Zhang, 1990 ACM.

"WF Q: Worst-case Fair Weighted Fair Queueing" by Jon C.R. Bennett, FORE Systems, and Hui Zhang, School of Computer Science, Carnegie Mellon University.

"Implementing Scheduling Algorithms in High-Speed Networks", Donpaul C. Stephens, Jon C.R. Bennett, Hui Zhang ; sponsored by DARPA.

"Hardware-Efficient Fair Queueing Architectures for High-Speed Networks" by Jennifer L. Rexford, Albert G. Greenberg and Flavio G. Bonomi.

"Efficient Fair Queuing using Deficit Round Robin" by M. Shreedhar and George Varghese, SIGCOMM 1995, Cambridge, MA, ACM.

"Fair scheduling with tunable latency: A round robin approach", Hemant M. Chaskar and U. Madhow. Supported by the U.S. Army Research Office under grant DAAH04-95-1-0246.

* cited by examiner

METHOD AND APPARATUS FOR FAIR QUEUEING OF DATA PACKETS

BACKGROUND OF THE INVENTION

1. Field of the Invention

The present invention relates to a method and apparatus for scheduling transmission of data packets in a packet network. More particularly, the present invention relates to a scheduler that can be used in high-speed traffic management equipment.

2. State of the Art

In packet networks, data is transmitted in variable-length packets from source to destination through network elements such as routers and switches. In general, there is a need for buffering data at these intermediate network elements because there may be a mismatch between offered (bandwidth presented to the network element) and available bandwidth on links attached to these network elements. The handling of packets in and out of these buffers is referred to as Traffic Management.

Part of Traffic Management is a scheduling discipline. This is an algorithm that selects a packet out of a pool of buffered packets to be transmitted. In a packet network where one wishes to guarantee minimum bandwidth and delay to certain traffic flows, or put "firewalls" between competing traffic flows, the choice of an appropriate scheduling discipline is essential. Other equally important components of traffic management, such as congestion control, need to complement the scheduling discipline to avoid the unfair monopolization of buffering resources.

The Internet Engineering Task Force (IETF) has proposed an Integrated Services framework (IETF RFC 1633) which provides the ability to guarantee minimum bandwidth and delay to a traffic flow in an IP network. While deployment of such a service may not be desired, practical or feasible on a wide area network such as the Internet, because of scalability, stability and robustness, it may be a useful tool in smaller networks or in networks that aggregate packet data traffic with other traditional telecom services.

With the advent of Multiprotocol Label Switching (MPLS), there is a genuine opportunity for IP networks to be deployed as a multi-service network. MPLS considerably simplifies per-flow classification in a data path compared to the orginal Integrated Services (IntServ) specification. IntServ is a protocol developed by the IETF to provide Quality of Service (QoS) over the internet. Quality of Service is the idea that transmission rates, error rates, and other characteristics can be measured, improved, and, to some extent, guaranteed in advance of transmission. QoS is of particular concern for the continuous transmission of high-bandwidth video and multimedia information.

In the book "An engineering approach to computer networking", ISBN 0201634422, S. Keshav describes general principles relating to scheduling operations. One known scheduling discipline is known as Generalized Processor Sharing (GPS). GPS is an ideal (and often unimplementable) work-conserving scheduling discipline that achieves a maximum-minimum weighted fair share (WFS) allocation of bandwidth. Quite a number of other scheduling disciplines have attempted to approximate GPS. The most noteworthy are Weighted Fair Queueing (WFQ), Self-Clocked Fair Queueing (SCFQ), Start-time Fair Queueing also known as Stochastic Fair Queueing (SFQ), Virtual Clock (VC), Worst-Case Weighted Fair Queueing ($WF^2Q$) and DRR (Deficit Round Robin).

The first proposed approximation of GPS was WFQ, which is described in "Analysis and simulation of a fair-queueing algorithm", by Demers, S. Keshav and S. Shenker in proceedings of ACM SIGCOMM '89, p. 1-12, Austin, Tex., September 1989. This approximation computes, based on a virtual time, the finish times for packets and then sorts packets so that they are sent out with the smallest finish time first. To calculate the finish-times, it keeps track of the equivalent GPS system.

SCFQ, as described by S. J. Golestani in "A self-clocked fair queueing scheme for broadband applications", in proceedings of IEEE INFOCOM '94, vol. 2, p. 643-646, June 1994, and SFQ, as described by P. Goyal, H. M. Vin and H. Chen in "Start-time fair queueing: a scheduling algorithm for integrated service access", in proceedings of ACM SIGCOMM '96, August 1996, avoid this latter complexity of WFQ by approximating the way the finish time is computed. Although a Relative-Fairness-Bound has been derived for SCFQ, it has a worst-case latency that is proportional to the number of sessions. SFQ improves on SCFQ by having a bounded worst-case latency.

Virtual Clock (VC), as described by L. Zhang in "Virtual clock: a new traffic control algorithm for packet switching networks", is an algorithm similar to WFQ, but the finish-time computation is simplified by using the real time instead of a virtual time (tracking the state of the GPS system). Because of this, however, the long-term unfairness of VC is not bounded.

$WF^2Q$, as described by Jon C. R. Bennett and Hui Zhang in "$WF^2Q$: Worst-case Fair Weighted Fair Queueing", INFOCOM '96, pages 120-128, March 1996, is the highest quality approximation of WFQ, but requires sorting of packets with respect to both start time and finish time. $WF^2Q+$ retains all properties of $WF^2Q$, but without the explicit need to track the state of the GPS system. It provides both firm Relative-Fairness-Bounds and Absolute-Fairness-Bounds.

Each of these algorithms discussed hereinabove requires a way to sort sessions, which is an operation of the order $O(\log N)$, with N the number of sessions. In "Implementing scheduling algorithms in high speed networks" by D. Stephens, J. Bennett and H. Zhang, IEEE Journal on Selected Areas in Communications, p. 1145-1158, 17(6), 1999, a framework is discussed for high-speed implementations of various WFQ approximations, including $WF^2Q+$. There, the idea of a logarithmic scale of groups is introduced, where each group holds sessions that have a similar service-interval. However, within each group, there is a sorting mechanism (using calendar queues). In "Hardware-efficient fair queueing architectures for high-speed networks", Infocom (2), pages 638-646, 1996, Jennifer Rexford, Albert G. Greenberg and Flavio Bonomi followed a similar approach for SCFQ algorithms; however sorting bins are required within each group.

DRR, described by M. Shreedhar and George Varghese in "Efficient fair queueing using Deficit Round Robin", SIGCOMM '95, pages 231-242, 1995, approximates GPS in a low-cost way. It extends Round-Robin (which is a GPS approximation for fixed-size packets) to work correctly for variable-size packets. DRR, like RR, does not require sorting logic. Also, it does not need to calculate a complex virtual-time function. However, DRR only offers long-term fairness, and has a delay-bound that is proportional to the number of sessions.

Hemant Chaskar and Upamanyu Madhow take an alternative approach in "Fair scheduling with tunable latency: a round robin approach", http://citeseer.nj.nec.com/ cheskar99fair.html, to implement a fair scheduler for fixed-size packets. Starting from Hierarchical Round Robin, a low-cost fair scheduler is derived with properties as good as WF²Q, called Multiclass WRR. Chasker and Madhow also suggest that a variabl;e length packet scheduler can be developed along the same lines as DRR. Hierarchical Deficit Round Robin (HDRR) can be considered as a native packet variant of Multiclass WRR, since the concept of service-groups, a hierarchical round-robin selection, and a mechanism to make sure that faster classes are served within a bounded delay are also introduced.

The Generalised Processor Sharing (GPS) discipline and its packet approximations, Fair Queueing (FQ), Weighted Fair Queueing (WFQ) and variants, are popular scheduling disciplines because of their useful properties with respect to bandwidth, proportional fairness, and delay. However, they are very complex to implement at high speeds. For example, an OC-192c SONET fiber, carrying a single channel of Packet-over-Sonet (PoS) IP packets, can transmit up to 25 Million Packets per second, it all the packets were the smallest 40B IP packets. This means that, in a Worst case situation, the scheduler must make a new scheduling decision every 40 ns.

The complexity for implementing WFQ-like disciplines mainly arises from two aspects: computing the timestamps, and sorting the sessions based on the timestamps. Some GPS approximations such as SCFQ and SFQ succesfully avoid the complex timestamp computation, but all existing solutions require sorting of sessions. Since this is very difficult and/or somewhat expensive to implement in hardware, cheaper and simpler alternatives such as DRR are favored for high-speed hardware designs. Deficit Round Robin does not require a sorting operation, but has no way to tune latency given to individual flows, and does not provide short-term fairness.

There is a need for a packet scheduling method and apparatus which provides both long-term and short-term fairness and at the same time is inexpensive to implement.

SUMMARY OF THE INVENTION

The above objectives are accomplished by a method and apparatus according to the present invention.

The present invention provides a packet scheduling discipline called Hierarhical Deficit Round Robin (HDRR), which approximates the GPS discipline. Compared to existing approximations of GPS (such as WFQ, WF²Q, SCFQ, SFQ), HDRR does not require a session sorting operation, and thus has a much lower complexity, making it well-suited for high speed hardware implementations. However, unlike other low complexity approximations such as DRR, HDRR retains all the desirable properties of GPS, such as (a) instantaneous fair allocation of bandwidth to back-logged sessions, and (b) service to leaky-bucket constrained sessions with a delay-bound independent of the number of sessions.

The present invention provides a packet scheduling method comprising the steps of:
enqueuing incoming data packets in sessions,
storing the sessions in sequential order in service-groups, each service-group being assigned a nominal service-interval in which time a data packet is to be transmitted, the nominal service-interval of one service-group being faster than the nominal service-interval of another service-group, and within one service-group, servicing one session until the nominal service-interval of any of the service-groups where there is at least one data packet to be sent is exceeded.

This procedure has the advantage that service is provided efficiently by dealing with one session but that change to another session is triggered whenever the nominal service interval for other service-groups is exceeded, i.e. when there is a need to change service group to maintain short term fairness.

Each data packet can have a priority for selection if the nominal service-interval of a service-group is exceeded and if a data packet from that service-group is not selected, then its priority for a next selection can be changed such as to give it a higher priority. This again improves short-term fairness.

The service-interval can be measured in accordance with virtual time, which virtual time is incremented in accordance with the time expected for transmission of the next packet to be sent. Alternatively, the service-interval can be measured in accordance with virtual time, which virtual time is incremented in accordance with the time for transmission of the latest packet sent. The use of a virtual time allows rational scheduling of packets even when the real time of service differs greatly from the expected time of service.

Each service-group may comprise a current session list and at least one new session list, in which case the method may further comprise:
holding a virtual time value,
in at least one of the service-groups, holding at least one session comprising at least a head-of-session data packet, the session having a required service-interval for its head-of-session data packet, sessions requiring different service-intervals for their head-of-session data packets being held in different service-groups,
at integer values of the virtual time value, swapping the new session lists into the current session lists for service-groups which may receive service at that virtual time value, if the current session list for that service-group is empty, and increasing a MissedSwaps counter for that service-group if the current session list for that service-group was not empty,
transmitting the head-of-session data packet from a session in a current session list,
scheduling transmission of the next data packet from that session based on the required service-interval of the previous data packet and a service interval it was actually given, and on the value of the MissedSwaps counter,
increasing the virtual time value, and
repeating the transmitting and increasing steps as long as the virtual time does not reach a next integer value, otherwise repeating the swapping step. By swapping at integer times a compromise is reached between short-term and long-term fairness.

The present invention also provides a packet scheduling apparatus comprising
an input device for receiving incoming data packets belonging to at least one session,
a bank of memories comprising memory sets for storing the incoming data packets, the memory sets having a nominal service-interval in which time a data packet is to be transmitted, the nominal service-interval of one memory set being faster than the nominal service-interval of another memory set,
an output device for transmitting the stored data packets, a processing element linked to the input device, the output device and the bank of memories for scheduling sessions to be serviced until the nominal service-interval of any of the memory sets where there is at least one data packet to be sent, is exceeded.

Each data packet may have a priority value for selection, in which case the apparatus may furthermore comprise a priority switcher for changing the priority value of a data packet for a next selection such as to give it a higher priority value if the nominal service-interval of a memory set is exceeded and if a data packet stored in that memory set is not selected.

The apparatus may furthermore comprise a timing unit for measuring the service-interval in accordance with virtual time, which virtual time is incremented in accordance with the time expected for transmission of the next packet to be sent.

Each memory set may comprise a current session list memory and at least one new session list memory for holding data packets, in which case the apparatus furthermore comprises:

input means for inputting arriving data packets into the memory sets, the data packets having a required service-interval, a timing unit for holding a virtual time value, means for swapping the content of the new session list memories into the current session list memories at integer values of the virtual time value, for memory sets which may receive service at that virtual time value, if the current session list memory for that memory set is empty, and a MissedSwaps counter for that memory set to be increased if the current session list memory for that memory set was not empty, means for transmitting data packets from a current session list memory, and a scheduler for scheduling transmission of a next data packet from that memory set based on the required service-interval of the next data packet to be sent, and on the value of the MissedSwaps counter.

The apparatus may furthermore comprise a timing unit for measuring the service-interval in accordance with virtual time, which virtual time is incremented in accordance with the time for transmission of the latest packet sent.

Each memory set may comprise a current session list memory and at least one new session list memory for holding data packets, in which case the apparatus may furthermore comprise:

input means for inputting arriving data packets into the memory sets, the data packets having a required service-interval, a timing unit for holding a virtual time value, means for swapping the content of the new session list memories into the current session list memories at integer values of the virtual time value, for memory sets which may receive service at that virtual time value, if the current session list memory for that memory set is empty, and a MissedSwaps counter for that memory set to be increased if the current session list memory for that memory set was not empty, means for transmitting data packets from a current session list memory, and a scheduler for scheduling transmission of a next data packet from that memory set based on the required service-interval of the previous data packet and a service interval it was actually given, and on the value of the MissedSwaps counter.

These and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DESCRIPTION OF ILLUSTRATIVE EMBODIMENTS

Figure 1:
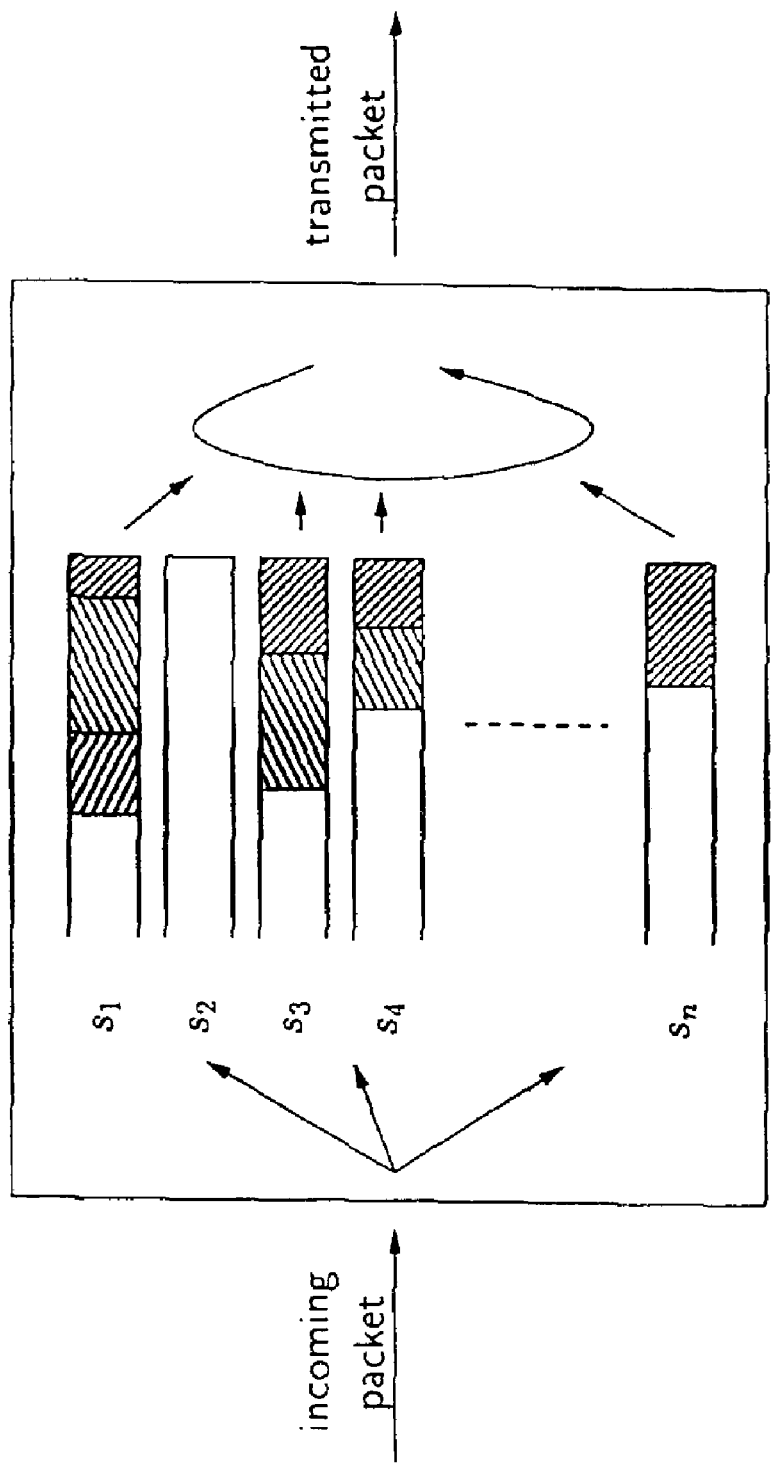
FIG. 1 illustrates a reference model for a packet scheduler within a traffic management component.

Turning now to FIG. 1, a scheduler 4 is part of a traffic manager 1, allocated to a particular transmission line, at a node of packat switched network. The packet switched network may be any packet switched network such as a landline telecommunications network or a mobile radio telecommunications network. Packet switched networks can be divided into those which allow an independent decision of the routing of a packet at each node (datagram systems) and those which set up a virtual circuit through the network and deliver packets along these virtual networks (virtual circuit systems). In any such system packets need to be buffered at various places in the system in order to deal with varying transmission rates and output port contention.

Figure 2:
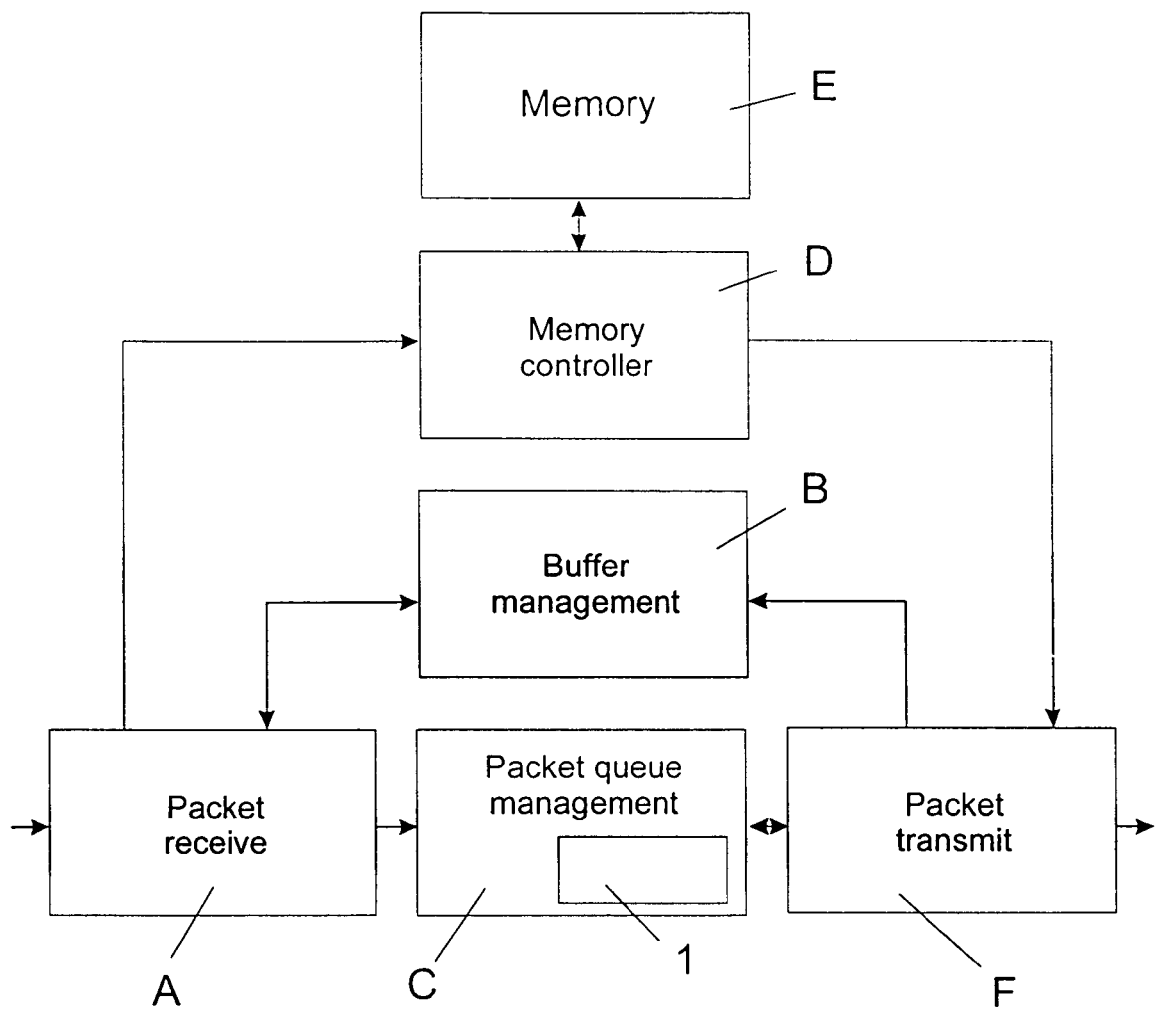
FIG. 2 illustrates an exemplary organisation of a traffic management component at a node of a packet switched network.

With reference to FIG. 2, packets enter the traffic management system with additional information such as destination queue, in a packet receive unit A. The packet receive unit A requests one or more free buffers from a buffer management unit B. The packet is enqueued by means of a descriptor, for instance, into a packet queue management unit C, while the packet itself is sent to a memory controller D, e.g. DRAM controller, which stores it in a memory E such as a DRAM.

A packet scheduler 1 inside the packet queue management unit C schedules a packet for transmission and de-queues the packet descriptor from its data structures. This is forwarded to a packet transmit unit F, which requests the memory controller B to retrieve the packet from the memory C. Subsequently, the buffer or buffers containing the packet are freed, and the packet is transmitted.

In one aspect, the present invention concerns the packet scheduler 1 and a method for operating it.

According to the invention, each Incoming packet 2 that arrives for enqueueing in the scheduler 1 has been classified into a session. A session is defined as a flow of packets that require a particular service, and thus its packets may be reordered with respect to packets of other sessions to accomplish this service treatment. However, the packets within a single session generally will not be reordered. The scheduler 1 maintains per-session queues $s_1, \ldots s_n$ in which these packets are queued. Sessions that hold at least one packet are back-logged; otherwise they are idle. The scheduling discipline according to the invention decides which packet 3 to transmit. Only head-of-session packets are considered by the scheduler 1. Thus, the scheduler 1 decides which back-logged session to service.

A data-structure for a scheduling method according to the invention includes an array of N service-groups $sg_0, \ldots, sg_{N1}$. A service-group includes sessions that require a similar service-interval for their head-of-session packet. The service-interval SI (unit: s) is the amount of virtual time that (ideally) elapses between the transmission of two consecutive packets for the session. As shown in Equation (1), the SI is a function of the session's rate $R_i$ (unit: Byte/s) and the packet length L (unit: Byte).

$$SI = \frac{L}{R_i} \quad (1)$$

While reference is made to the (guaranteed) rate ($R_i$) of a session, more correctly this value specifies a "weight". Each back-logged session will receive service in accordance with this weight, while the scheduler 1 tries to use all available bandwidth. The service that a session has received is the amount of data (in Bytes) that the scheduler 1 has transmitted for a session.

The virtual time keeps track of the progress of time, but differs from the real time by taking into account the number of back-logged sessions and their weights. The smaller the total weight of all back-logged sessions, the faster the virtual time progresses. With respect to the virtual time, every session transmits at its guaranteed rate, which means that with respect to real time, every session will transmit at its weighted fair rate.

Weighted fairness, the notion that every session needs to receive its fair share of service, can be measured by comparing the weighted service that is given to sessions, over a period of time, P as shown in Equation (2) where the sum is the amount of service given during the period P. The closer this value is to 1, the the fairer the service given to these sessions.

$$\text{Fairness } i \text{ vs } j = \frac{\frac{\sum_P L_i}{R_i}}{\frac{\sum_P L_j}{R_j}} \quad (2)$$

With respect to fairness, a scheduler can exhibit two distinct qualities: long term fairness and short term fairness. Long-term fairness is related to the situation where $P \to \infty$ and measures whether a scheduler will eventually give the right service to each session. Long-term fairness thus measures how well, on a longer time-scale, the scheduler isolates flows from each other. Short-term fairness is related to the situation where $P \to 0$, and measures whether the scheduler gives fair service to each session on a short time-scale. Short-term fairness is an important property since a short-term fair scheduler reduces the burstiness of the bandwidth that each connection perceives; and because of that, it reduces the amount of buffering needed within network nodes. It also has important end-to-end implications since it reduces the worst-case latency that is experienced by packets, and it gives the end-to-end flow-control mechanisms (such as TCP, the Internet Transmission Control Protocol, RFC 793) a better opportunity to estimate available bandwidth, improving link usage and application performance and robustness.

According to the invention, the service-intervals associated with service-groups are preferably chosen on a logarithmic scale, e.g. $SI_{sgi}=2^i\_SI_{sg^0}$. A logarithmic scale with base 2 is presently used. However, the choice of a logarithmic scale with base 2 is arbitrary, and the methods of the present invention can be implemented other logarithmic bases as well.

For the purpose of comparing service-groups it is defined that the rate of $sg_i$ is faster than the rate of $sg_j$ if i<j. After servicing a session in a service-group i, if the session is still back-logged, the session moves to a new service-group which is in general different from service-group i. A continously back-logged session moves between service-groups so that the scheduler according to the present invention assures long-term weighted fairness for all sessions.

Each service-group keeps track of two or more session lists: a current session list (CurrentSessionList) and a number of new session lists (NewSessionList). A session is always enqueued in one of the NewSessionLists, and the scheduler will service sessions that are present in the CurrentSessionLists. Using a well-controlled mechanism, the contents of particular NewSessionLists are transferred to the CurrentSessionList of that service-group, making the sessions available for service.

Whenever the scheduler transmits a packet, it makes a choice based on available sessions in the CurrentSessionLists in the following way: it picks the first packet from the CurrentSessionList in the fastest service-group that has a non-empty CurrentSessionList. Whenever a session is serviced, it is removed from that CurrentSessionList and possibly added to a NewSessionList of some service-group, if the session is still back-logged.

The scheduler maintains a monotonically increasing integer virtual time, VT for transferring the contents of NewSessionLists to CurrentSessionLists. The MayService($sg_i$, VT) function determines whether sessions in group $sg_i$ may receive service at virtual time VT. This function is defined as shown in Equation (3).

$$\text{MayService}(sg_i, VT)=\text{true if } VT \bmod 2^i 0 \quad (3)$$

According to the present invention, the virtual time VT may be increased for two reasons. VT is increased at every packet transmission based on the time required to transmit that packet, taking into account the total weight of all back-logged sessions. Alternatively, VT may be increased when all the CurrentSessionLists are empty, but not all of the NewSessionLists.

When VT reaches a value that re-triggers a number of service-groups, i.e. each service-group for which MayService($sg_i$, VT)=true, the respective first NewSessionLists are swapped into the CurrentSessionLists for these groups, and each of the other NewSessionLists are swapped into their precessor. As a result, sessions become available for servicing.

However, the swapping of the session lists is not always possible for all service-groups, e.g. when the CurrentSessionList is not empty, there is no swap. The reason why the CurrentSessionList may not be empty is because the SI for the service-group may only be an approximation of the desired SI for each session in the group. On the other hand, VT will be increased based on the actual packet length of the packet being transmitted, and the actual weights of the back-logged sessions. One way to resolve this is to refuse to increase VT as long as any of the service-groups that would be triggered by the increase of VT has a non-empty CurrentSessionList. This, however, can potentially defeat the whole effort to add short-term fairness to the algorithm. The way this is solved according to the present invention is to tolerate that groups with non-empty CurrentSessionLists miss their swap of NewSessionList to CurrentSessionList.

Therefore, each service-group has a counter called MissedSwaps that keeps track of the number of swaps that a service-group has missed. In addition, each service-group has a number of NewSessionLists, each corresponding to a value of the MissedSwaps counter. The value of the MissedSwaps counter indicates which of the NewSessionLists must be used when enqueueing sessions into a service-group. A real implementation may bound the maximum number of swaps a service-group may miss (MaxMissedSwaps), and therefore also bound the number of NewSessionLists to MaxMissedSwaps+1. Each time an increase of VT would need to swap a service-group but that service-groups CurrentSessionList is not empty, the MissedSwaps counter is increased. When an increase of VT would increase the MissedSwaps counter for a service-group over the value of MaxMissedSwaps, the increase of VT is then preferably prevented until the scheduler has emptied that service-groups CurrentSessionList (which will decrease the value of MaxMissedSwaps as will be shown later).

As mentioned above, there are the two ways for increasing VT. First of all, it may happen that all of the CurrentSessionLists are empty (because each time a packet is transmitted, its session gets removed from these lists). When some NewSessionList is not empty, then the value of VT is increased so that at least one service-group with non-empty NewSessionList swaps its lists. If $sg_i$ is the fastest service-group with a non-empty NewSessionList, then the new time VT, which is the smallest time (greater than the current value) for which at least one service-group will service at least one session, can be expressed as shown in Equation (4).

$$VT \leftarrow (\lfloor VT \times 2^{-i} \rfloor + 1) \times 2^i \qquad (4)$$

Secondly, VT is updated gradually at each packet transmission time. The integer quantity VT, with its effect on how service-groups are triggered is complemented by a floating-point quantity (VTF) such that the sum of the two quantities tracks the virtual time (vt=VT+VTF) which is updated at each packet transmission as shown in Equation (5) where L is the length of the data packet to be transmitted, and TotalRate is the sum of the guaranteed rates for all currently back-logged sessions.

$$vt \leftarrow vt + \frac{L}{TotalRate \times SI_{sg0}} \qquad (5)$$

Each time vt is updated, the values of VT and VTF are adjusted so that VT is increased maximally while swapping the appropriate service-groups, and VTF is the residu. It may happen that VT cannot be increased beyond certain values for reasons as discussed earlier: e.g. when a service-group has reached its maximum number of missed swaps. The effect of this gradual increase of VT is that the scheduler interrupts the servicing of slower service-groups by giving the appropriate service to faster service-groups.

The following discussion describes how a session is enqueued into a NewSessionList of a service-group, and the calculations that take place when a packet is dequeued. First it is described how a service-group is selected for (a) a session that has received service and moves to a new service-group because the session still is back-logged, or (b) a session that becomes back-logged because a new packet arrives for it.

Every session $s_i$ stores an $RSI_i$ (Required Service Interval) quantity for this purpose. The value of RSI is updated when a session is enqueued in a service-group, or when a data packet is transmitted and thus a session is dequeued from a service-group.

When a session gets dequeued, the value of RSI for that session may be updated to adjust when a packet gets dequeued from a service-group that has non-zero MissedSwaps as illustrated in Equation (6) below.

$$RSI_i \leftarrow RSI_i - MissedSwaps_{sgi} \times SI_{sgi} \qquad (6)$$

This calculation provides that if it has taken too long to send a data packet from a service-group, which can be seen from a non-zero MissedSwaps counter for that service-group, the missed service is remedied at the next data packet.

If after giving service to a session $s_i$ the CurrentSessionList becomes empty, missed swaps, if they exist for this service-group, are processed as follows: the first NewSessionList is swapped into the CurrentSessionList, all NewSessionLists get swapped into preceeding NewSessionList, and the MissedSwaps counter is decremented. This may be repeated until the MissedSwaps counter is 0 or the CurrentSessionList is not empty.

In the case where a session moves to another service-group, the current value of RSI (possibly containing a residu from previous iterations) is preferably updated based on the required service for the head-of-session packet as illustrated in Equation (7) where $L_{s^i}$ is the length of the head-of-session packet for session $s_i$.

$$RSI_i \leftarrow RSI_i + \frac{L_{si}}{R_i} \qquad (7)$$

Alternatively, though not presently preferred, the current value of RSI may be based on the service that was required for the latest sent (previous) data packet.

A new service-group $sg_j$ for session $s_i$, that just has been serviced (in service-group $sg_k$), is defined by Equation (8) (if RSI>0) with $SI_{sg^0}$ the service interval associated with service-group 0:

$$j = \left\lfloor \log_2\left(\frac{RSI_i}{SI_{sg0}}\right) \right\rfloor \qquad (8)$$

When the value of RSI of session $s_i$ becomes negative (because e.g. the actual service given to the data packet, ASI, was far bigger than the desired service-interval RSI, or the service-group in which the session was had missed swaps, and thus service), that session $s_i$ keeps receiving service until the value of RSI becomes positive again. While doing that, RSI is updated using the same formulas (see above and below), but using a value of 0 for ASI.

When a session moves, after transmission of its head-of-session packet, to a new service-group, it is put in one of that group's NewSessionLists. To adjust for the inaccuracy in the actual service interval given, the RSI value is updated with ASI (Actual Service Interval) by accounting for the service interval it was actually given (in service-group $sg_k$) as illustrated in the pair of Equations (9).

$$\begin{cases} ASI \leftarrow SI_{sg0} \times 2^j & \text{for } j = k \\ ASI \leftarrow SI_{sg0} \times [(\lfloor VT \times 2^{-j} \rfloor + 1) \times 2^j - \lfloor VT \times 2^{-k} \rfloor \times 2^k] & \text{for } j \neq k \end{cases} \quad (9)$$

Figure 3:
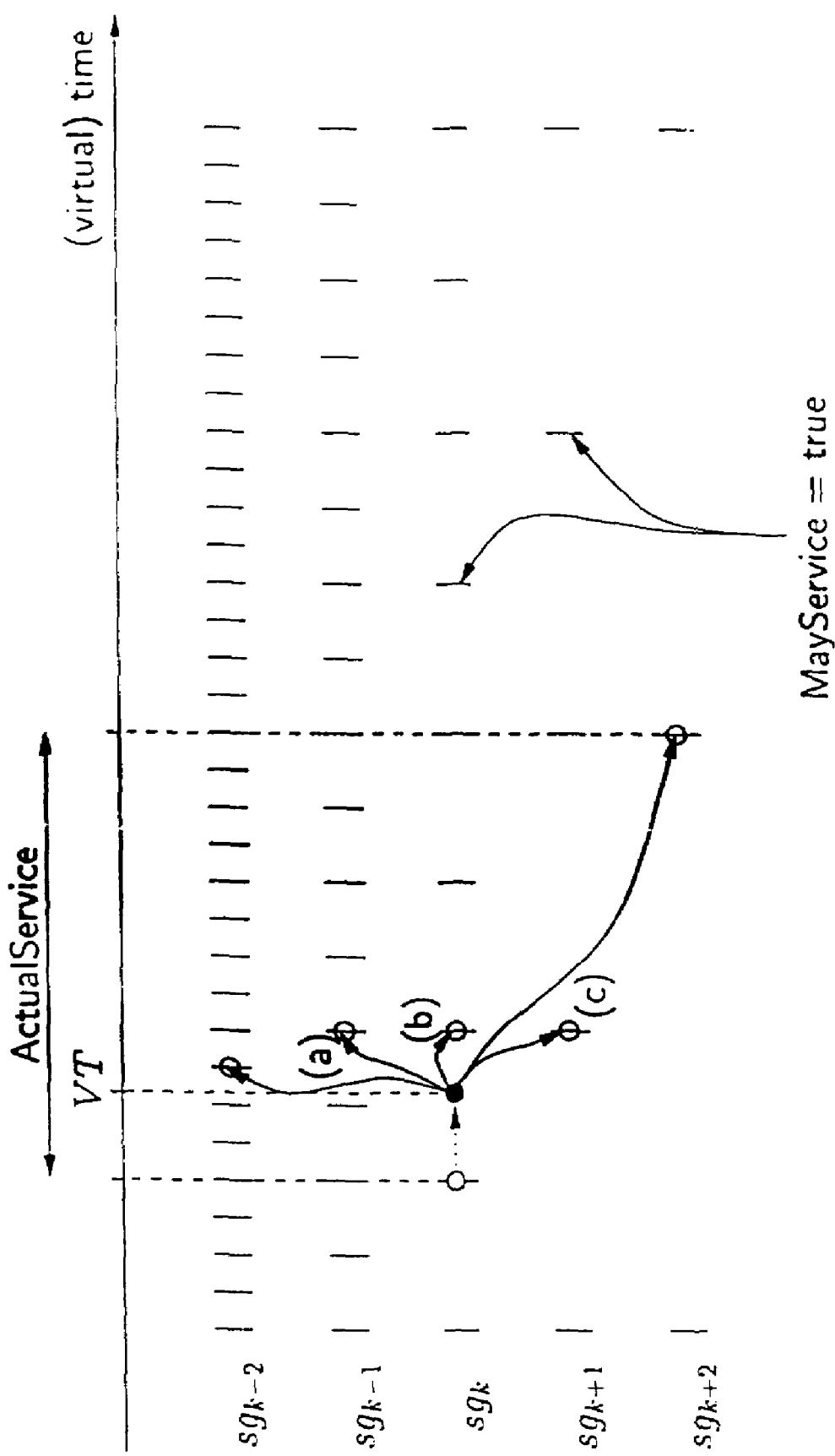
FIG. 3 illustrates decision moments for different service-groups according to an embodiment of the invention.

The second calculation takes into account the value of VT which will trigger the new service-group j to be serviced. These calculations are shown graphically in FIG. 3.

Using the above value of ASI, $RSI_i$ is updated according to Equation (10).

$$RSI_i \leftarrow RSI_i - ASI \quad (10)$$

When enqueueing a session in a service group, it is enqueued in the last NewSessionList, based on the Missed-Swaps value for that service group.

When a session $s_i$ was idle and becomes back-logged, negative values of RSI are discarded by resetting RSI to 0 as illustrated in Equation (11).

$$RSI_i \leftarrow \max(RSI_i, 0) \quad (11)$$

In this way, there will never be given too much service to a session that continuously toggles between idle and back-logged.

After resetting RSI to 0, the same group selection as described above is still used. Thus, the service-group is based on information of the head-of-session packet that is to be transmitted.

For the very first packet of a session, the value of RSI can be initialised to 0. For the alternative update strategy for RSI based on the service for the latest packet, for the very first packet of a session, the value of RSI can be initialised as shown in Equation (12) where $L_{avg}$ is the average packet length of session $s_i$.

$$RSI_i \leftarrow \frac{L_{avg}}{R_i} \quad (12)$$

The number of service-groups N affects the dynamic range of the scheduler (which is the product of the dynamic range of packet sizes and rates). The service interval for the fastest service group $SI_{sg}^0$, sets the bound of this dynamic range to an absolute value (i.e. for the smallest packet at the fastest transmission rate).

In the scheduling method according to the present invention that service-groups are given service starting with the fastest group. Moreover, service-groups are given service as long as its CurrentSessionList is not empty, regardless of the value of VT (which may increase while the CurrentSessionList is not empty).

When discussing implementation complexity of the scheduler of the present invention, it is important to consider both time complexity and memory complexity. With respect to the number of sessions, the time complexity of the scheduler of the present invention is O(1). Equally important however, is the bandwidth required for the data-structures in the algorithm. The scheduler of the present invention requires significant bandwidth for the service-group data-structure, since these need to be scanned for a non-empty CurrentSessionList.

The total number of service-groups is limited. For example, a range of rates of $2^{20}$ and a range of packet sizes of $2^{12}$ requires 32 service-groups. This can be further tuned by the chosen logarithmic base that, as an example, was set 2 for the present description. As the total number of service-groups is limited, the total state is relatively small. As a consequence this high-bandwidth memory can be kept on-chip. This contrasts with other WFQ approximations that require a mechanism to sort sessions. Clever implementations (such as proposed by D. Stephens, J. Bennett and H. Zhang in "Implementing scheduling algorithms in high speed networks", 1999) offer solutions that can do this sorting operation in bounded time, but only by requiring high bandwidth for a relatively large amount of per-scheduler state (such as calendars), and by introducing also a considerable inaccuracy.

With respect to the CurrentSessionList and the multiple of NewSessionLists, it can be observed that sessions are only de-queued from the head of the CurrentSessionLists, and appended at the tail of the last NewSessionLists. This greatly simplifies the implementation of this data-structure.

Furthermore, a careful implementation of the invention does not require any division operations.

A scheduling method or scheduling scheme according to an embodiment of the present invention is functionally described in pseudo-code below.

Procedure HDRRenque(p,s) is called for each arriving packet p belonging to a session s.

procedure HDRRenque(p,s)

```
 1: enque(p,s)
 2: if length(s)=1 then
 3:     TotalRate ← TotalRate + rate(s)
 4:     phi ← length(p)/rate(s)
 5:     RSI(s) ← max(RSI(s),0)
 6:     RSI(s) ← RSI(s) + phi
 7:     group ← findgroup(RSI(s))
 8:     ASI ← SI_sg0 _2^group
 9:     RSI(s) ← RSI(s) − ASI
10:     enque(s,NSL(group)[MS(group)])
11: end if
```

When the session s to which packet p belongs was idle and becomes back-logged, it is inserted into the service-group structure of the present invention (lines 2-10). TotalRate is updated to include the rate of this session. If the session s to which packet p belongs was not idle, i.e. already contained packets, then TotalRate does not change, and packet p is simply enqueued in session s which is already enqueued in a session list within a service-group.

Line 5 makes sure that when a session had not received its instantaneous fair rate (a negative value for RSI(s)) in the past, but nevertheless became idle, the scheduler does not try to make up for this. On the other hand, when the scheduler had given too much service to this session, this is accounted for since otherwise a session could receive too much service by cycling between idle and back-logged.

Lines 6-9 perform the calculations of updating the session RSI(s) and locating the service group for the session s.

Line 10, finally, enques the session s into the correct NewSessionList (NSL) within that service-group. This takes into account the number of MissedSwaps (MS) for this service-group.

Procedure findgroup(RSI), used in the procedure HDRRenque(p,s), calculates the appropriate group for a session that becomes back-logged. This procedure is illustrated in following pseudocode.

procedure findgroup(RSI)

1: Return $\lfloor \log_2\left(\frac{RSI}{SI_{sg0}}\right) \rfloor$

The scheduling and transmission of packets out of the group structure is described by the following pseudocode.

procedure scheduler

```
1:  while true do
2:      while all CSLs are empty do
3:          if not all NSLs are empty then
4:              increase VT( )
5:          else
6:              wait until packets arrive
7:          end if
8:      end while
9:      g ← fastest group with non-empty CSL
10:     s ← deque(CSL(g))
11:     RSI(s) ← RSI(s)MS(g)__SI_sg^g
12:     while MS(g)>0 and CSL(g) is empty do
13:         shiftsessionlists(g)
14:     end while
15:     repeat
16:         p ← deque(s)
17:         VTF <- VTF + length(p) / (TotalRate * SI_sg0)
18:         transmit(p)
19:         if session s is idle then
20:             TotalRate ← TotalRaterate(s)
21:             sessiondone ← true
22:         -ls-
23:             p ← head(s)
24:             phi ← length(p)/rate(s)
25:             RSI(s) ← RSI(s) + phi
26:             if RSI(s)>0 then
27:                 newg ← findgroup(RSI(s))
28:                 ASI ← actualservice(newg,g)
29:                 RSI(s) ← RSI(s)ASI
30:                 enque(s,NSL(newg)[MS(newg)])
31:                 sessiondone ← true
32:             else
33:                 sessiondone ← false
34:             end if
35:         end if
36:     until sessiondone= true
37:     updateVTwithVTF( )
38: end while
```

Preferably, the scheduler algorithm is only interrupted for enqueueing incoming packets between lines 1 and 2 of the pseudocode algorithm as given above.

At line 4, VT is increased so that at least one group (the fastest one) with a non-empty NewSessionList NSL[0] swaps its NewSessionList NSL[0] into a CurrentSessionList CSL. If all CSL and all NSL[0] lists are empty, then the scheduler is idle, and waits for new packets to be enqueued (line 6).

Lines 9-10 pick the session for which a packet will be transmitted. At line 11, the RSI of the session is adjusted by taking into account a possibly increased ASI for the packet that will be transmitted, because of missed swaps for the group. The loop at lines 12-14 handles the case where a last session is dequeued for the group (out of the CSL) and swap operations that were missed in the past are processed.

The loop from line 15 to 36 transmits one or more packets for the session. More packets may be transmitted to make up for missed service because of missed swaps.

For every packet transmitted, the value of VTF is increased (at line 17), and finally VT is adjusted based on these increases (at line 37). Lines 23-34 deal with the next packet for the session. Either, the packet has to be transmitted immediately (line 33), or the session has to be reenqueued in a new service group (lines 27-31).

The procedure increase VT increases VT when all CSLs are empty, but there is at least one non-empty NSL. This procedure is illustrated in the following pseudocode.

procedure increase VT( )

```
1: g ← fastest group with non-empty NSL[0]
2: newVT ← (⌊VTx2^-g⌋+1) × 2^g
3: lastg ← groupstoswap(VT,newVT)
4: VTF ← 0
5: VT ← newVT
6: for i=0 to i=lastg do
7:     CSL(i) ← NSL(i)[0]
8:     NSL(i)[0] ← empty
9: end for
```

The procedure groupstoswap(oldVT,newVT) calculates up to which service-group the lists need to be swapped, because of the increase of VT from oldVT to newVT.

procedure groupstoswap(oldVT, newVT)

1: mask←oldVT xor newVT

2: Return position of most most significant bit of mask, with 0 the position of the lsb of mask The procedure shiftsessionlists(g) shifts the session lists for group g.

procedure shiftsessionlists(g)

```
1: CSL(g)←NSL(g)[0]
2: for i=1 to i=MaxMissedSwaps do
3:     NSL(g)[i1]←NSL(g)[i]
4: end for
5: NSL(g)[MaxMissedSwaps]←empty
```

Procedure actualservice(newg,oldg) calculates the actual service a packet receives, when moving from group oldg to group newg, taking into account the current time VT:

procedure actualservice(newg, oldg)

1: Return $SI_{sg}{}^0 \times [(\lfloor VT \times 2^{-newg} \rfloor 1) \times 2^{newg} - \lfloor VT \times 2^{-oldg} \rfloor \times 2^{oldg}]$ Procedure updateVTwithVTF( ) updates the values of VT and VTF and possibly triggers new groups based on the increase of VT:

procedure actaulservice(newg, oldg)

```
1:  if all groups have empty CSL and NSL[0] then
2:      VT ← 0
3:      VTF ← 0
4:      Return
5:  end if
6:  g ← first group with non-empty CSL or NSL[0]
7:  VTg ← (⌊VT ×2^-g⌋+1)×2^g
8:  if ⌊VT + VTF ⌋<VTg then
9:      Return
10: end if
11: lastg ← groupstoswap(VT,VTg)
12: lastg ← max(lastg,slowest group)
13: if there is a group i ≦ lastg with MS(i)=MaxMissedSwaps then
14:     Return
15: end if
16: newVT ← VTg
17: VTF ← VTF(newVTVT)
```

-continued

```
18:   VT ← newVT
19:   for i=0 to i=lastg do
20:     if CSL(i) is not empty then
21:       MS(i) ← MS(i) + 1
22:     else
23:       CSL(i) ← NSL(i)[0]
24:       NSL(i)[0] ← empty
25:     end if
26:   end for
```

If the scheduler is empty, then the values of VT and VTF are reset (lines 1-5).

Next, the procedure will attempt to increase the value of VT so that the fastest group with a non-empty CSL or NSL[0] will swap its lists. This value of VT is calculated in line 7 as VTg.

Lines 8-10 handle the case where not enough data has been transmitted to be able to trigger this swap to happen. In that case the values of VT and VTF are left unchanged.

Lines 11-15 handle the case where VT cannot be increased to the value of VTg because one of the groups that would need to be swapped (up to lastg) has already reached its maximal amount of missed swaps. In this case, the need to increase VT is ignored. It is to be noted that this situation can be avoided by increasing the value of MaxMissed-Swaps. Line 12 takes into account that the number of service-groups is finite Finally, lines 16-26 handle the case where VT can be increased to VTg, and the resulting swap operations (lines 23-24), or increases of MS (line 20) are performed as a result of that.

What follows is a simulation, based on the above pseudo-code, with reference to the drawings in order to clarify what happens with different packets and/or sessions during the scheduling and transmission thereof.

As an example, four sessions will be considered:
session s0 with rate R0: 80 B/s
session s1 with rate R1: 160 B/s
session s2 with rate R2: 80 B/s
session s3 with rate R3: 40 B/s It is assumed that all packets which belong to those sessions will have the same length: e.g. L=320 B.

Figure 4:
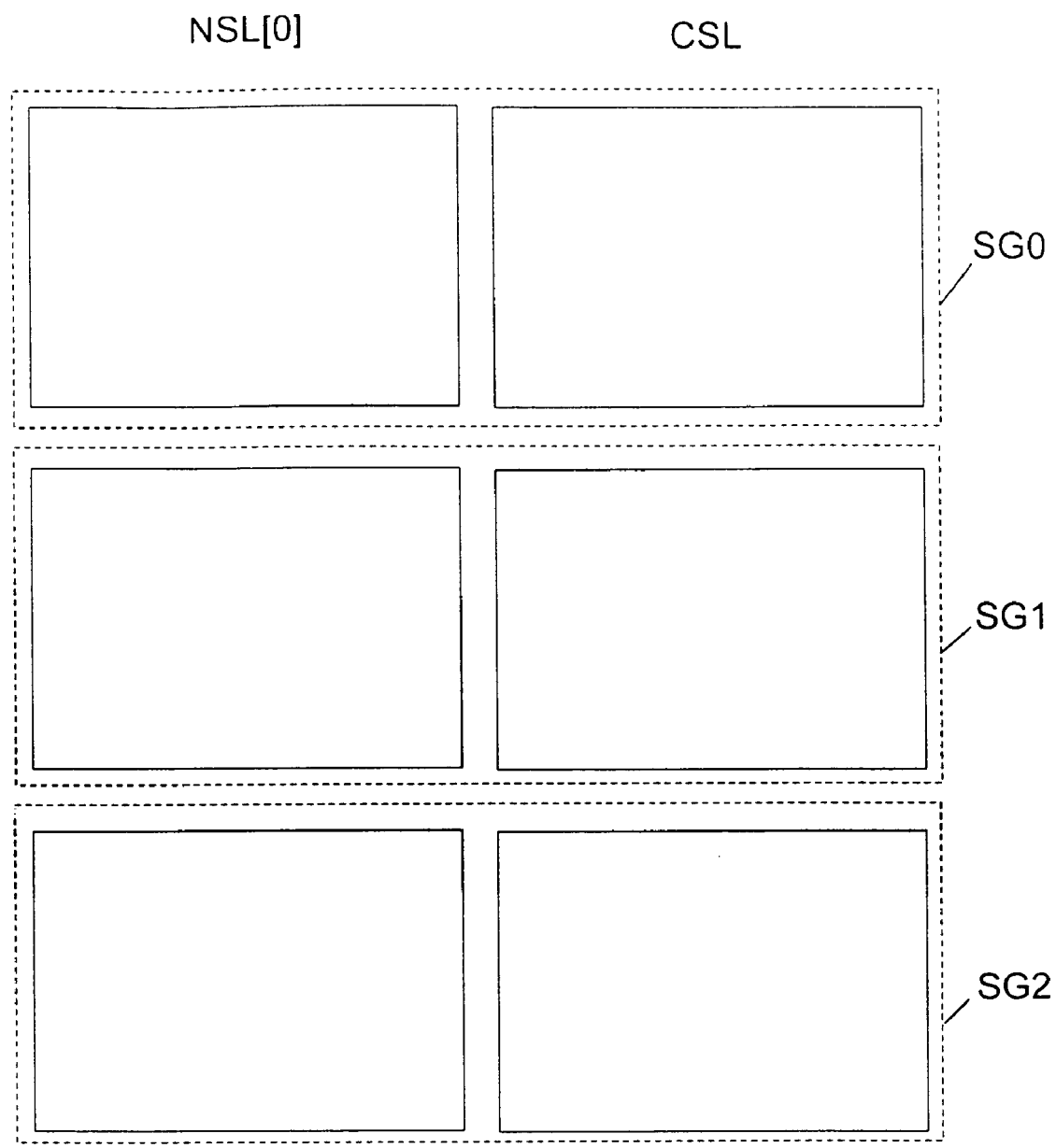
FIG. 4-FIG. 17 illustrate different stages in a process flow of a scheduling method according to an embodiment of the invention.

/procedure scheduler /
At VT=0, all CSL and all NSL are empty. The system waits until packets arrive. This is shown in FIG. 4.

Figure 5:
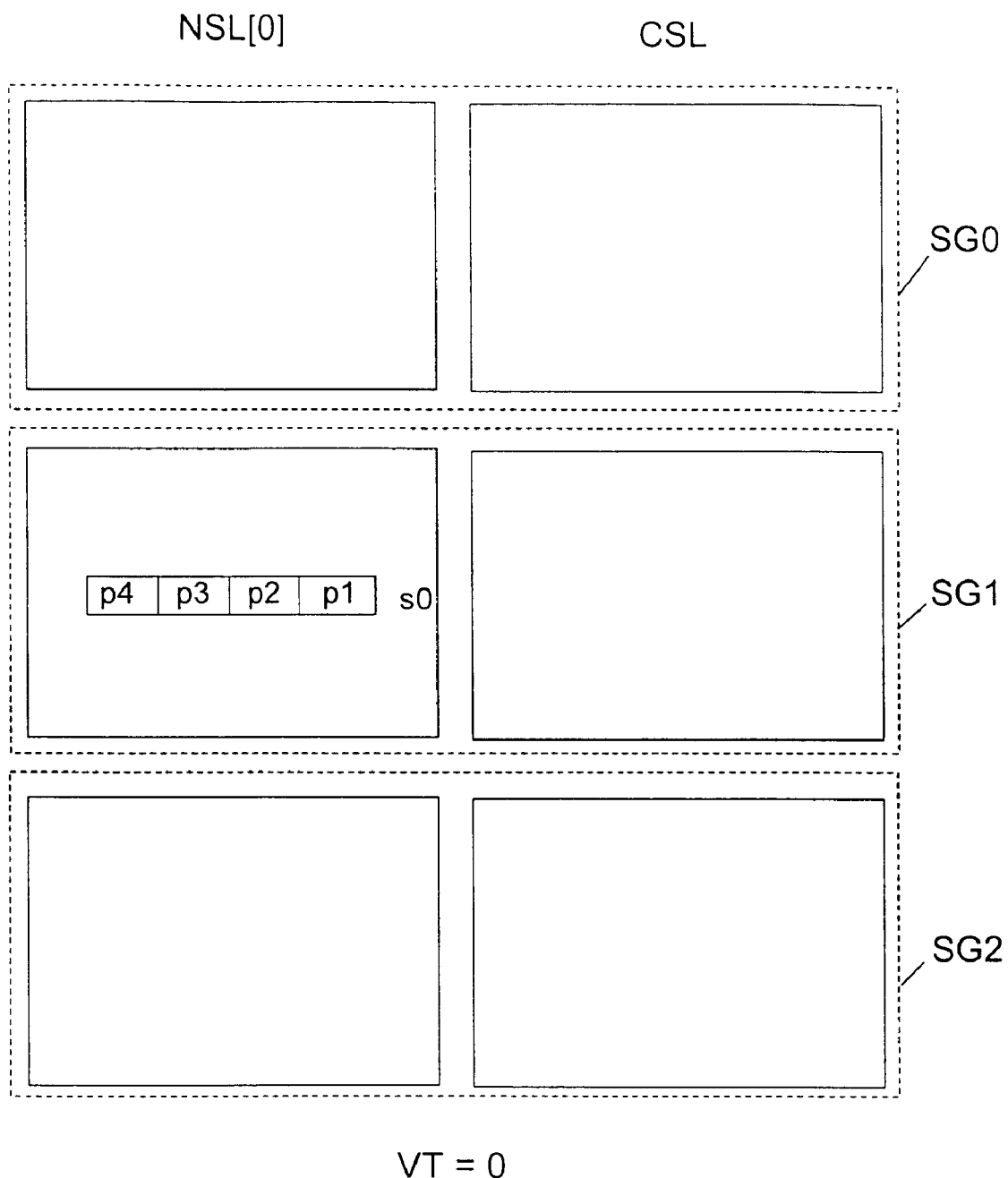

/ procedure HDRRenque (p,s) /
Still at VT=0, packets p1 to p4, belonging to session s0 arrive as illustrated in FIG. 5.

Packet p1 is enqueued in session s0.
TotalRate=80 [B/s].
Phi=320/80=4
RSI(s0)=0; initialised as such for the very first packet of a session
RSI(s0)=0+4=4
Group=$\lfloor \log_2(4/2) \rfloor$=1; session s0 will be entered into SG1
ASI=$2*2^1$=4
RSI(s0)=4-4=0
s0 is enqueued in NSL[0] of SG1.

Packet p2 belonging to session s0 arrives and is enqueued in session s0.
Packet p3 belonging to session s0 arrives and is enqueued in session s0.
Packet p4 belonging to session s0 arrives and is enqueued in session s0.

The result is shown in FIG. 5.

/procedure scheduler /
Still at VT=0, all CSL are empty, but not all NSL[0] are empty: NSL[0] of SG1 contains 1 session s0 for which 4 packets p1, p2, p3, p4 have arrived.

/ procedure increase VT( ) /
g=1; SG1 is the fastest group with non-empty NSL[0]
newVT=$(\lfloor VT*2^{-g} \rfloor+1)*2^g$=$(\lfloor 0*2^{-1} \rfloor+1)*2^1$=2
lastg=1; therefore SG0 and SG1 may swap the content of their NSL[0] into CSL
VTF=0
VT=2

Figure 6:
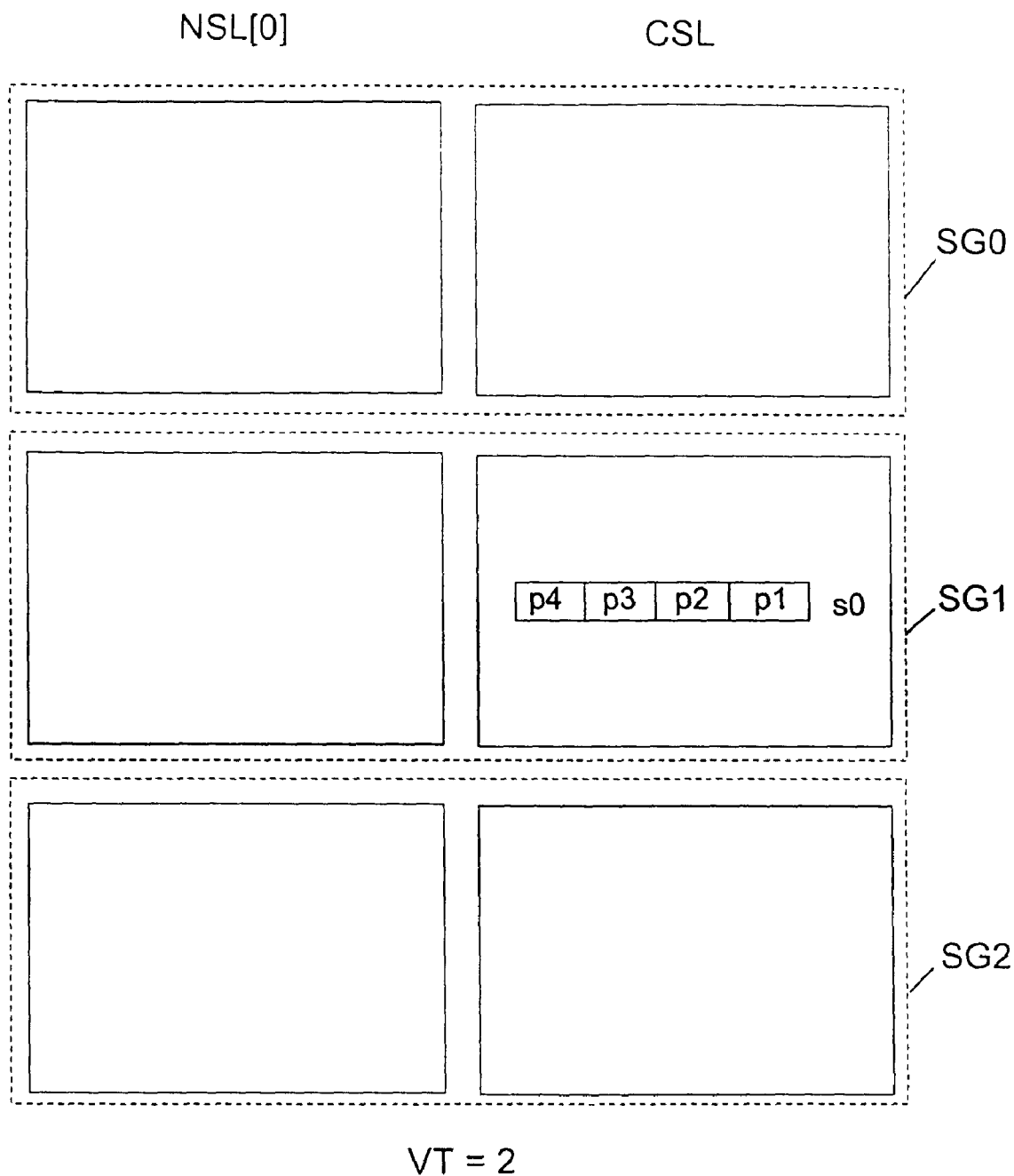

The content of NSL(SG1)[0] is swapped into CSL(SG1), and the content of NSL(SG1)[0] is emptied as shown in FIG. 6

Figure 7A:
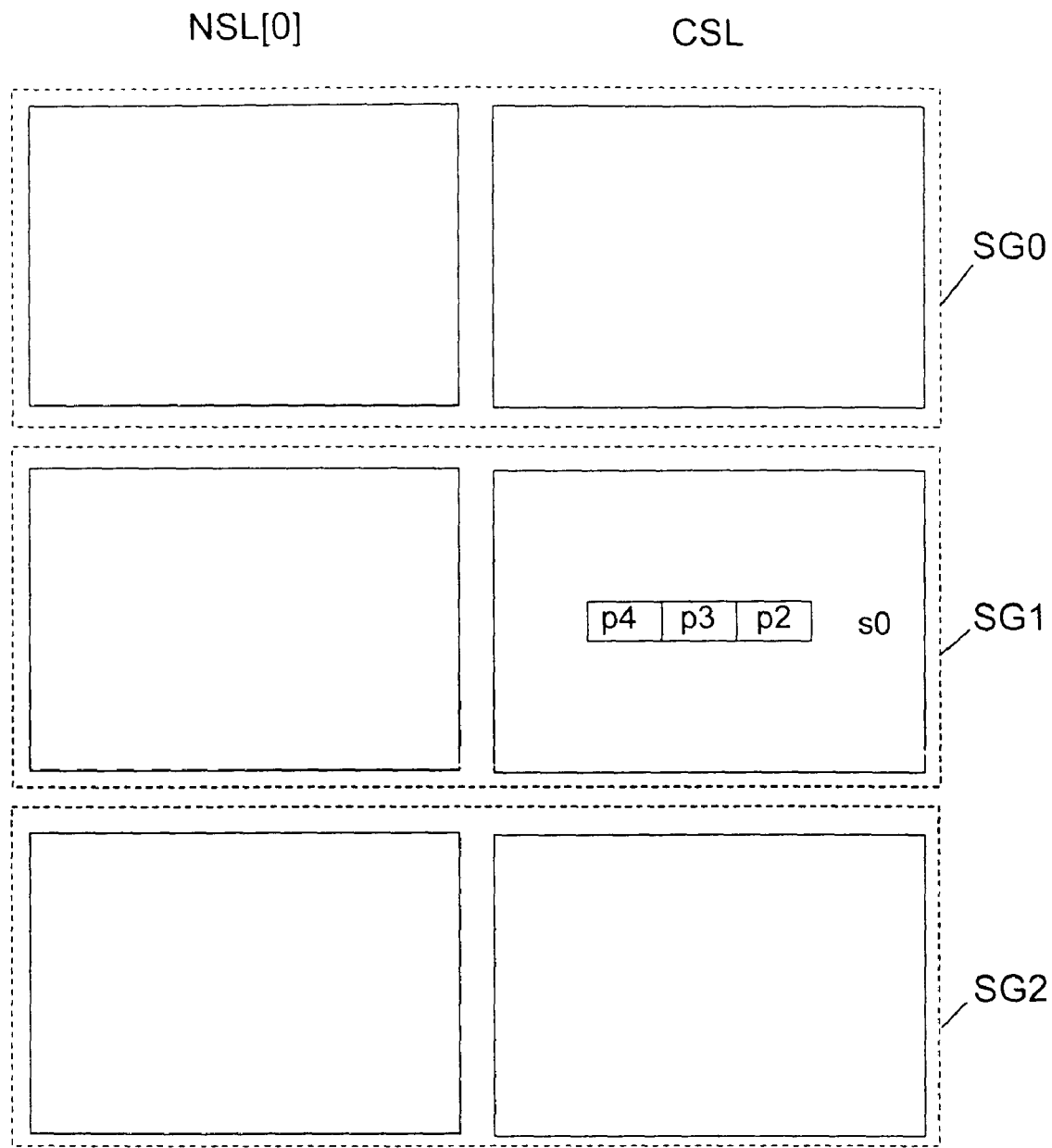
Figure 7B:
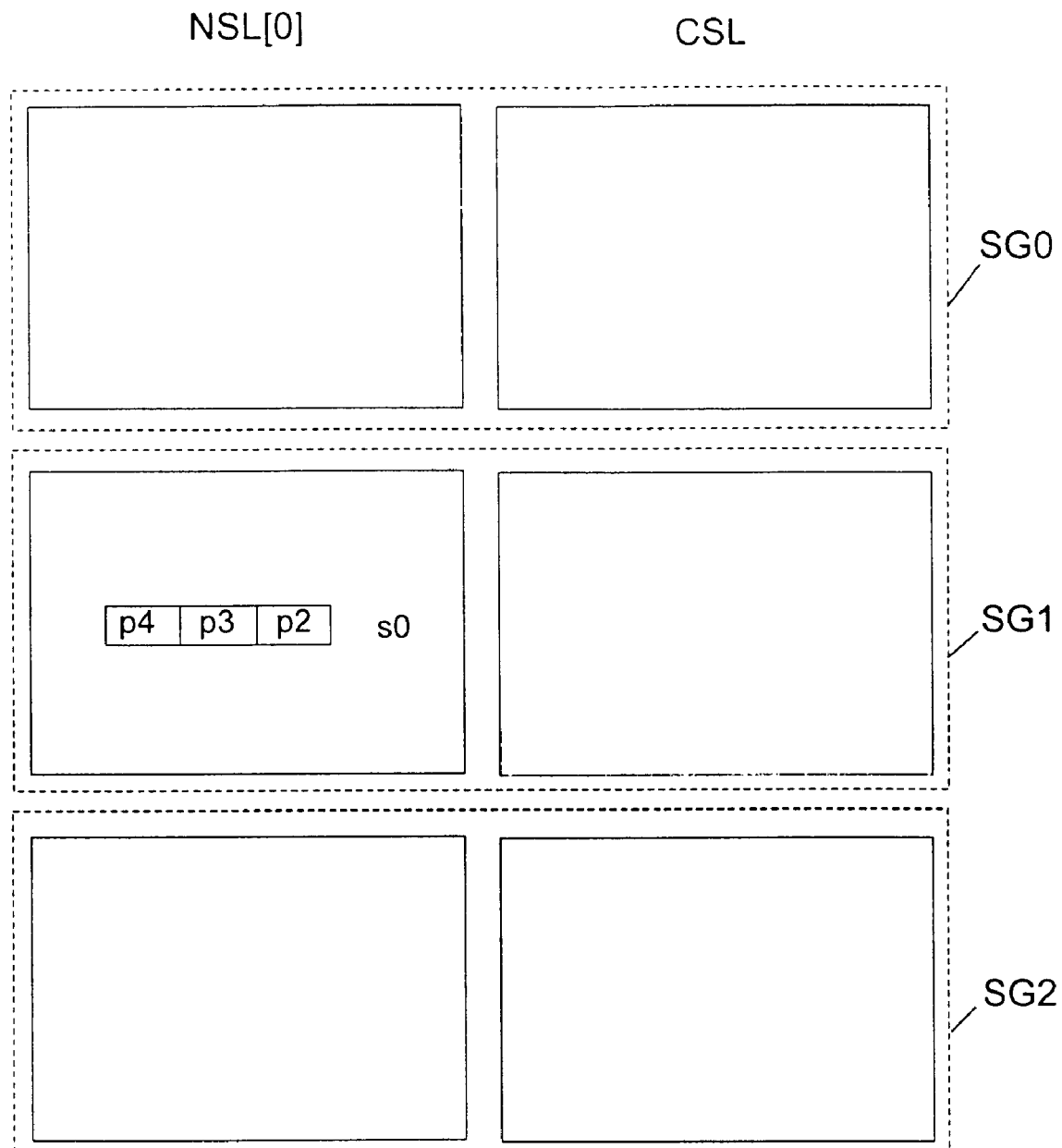

/ procedure scheduler /
g=1; SG1 is the fastest (and the only) group with CSL non-empty.
There is only 1 session s0 in SG1 from which packets need to be transmitted. This session, s0, is selected.
RSI(s0)=0
Packet p1 is dequeued from s0, its length is obtained, and VTF=0+320/(80*2)=2.
Packet p1 is transmitted, and packet p2 becomes the next packet to be transmitted as shown in FIG. 7a.
Phi=320/80=4[s].
RSI(s0)=0+4=4[s].
Newg=findgroup (4)=$\lfloor \log_2(4/2) \rfloor$=$\lfloor \log_2 2 \rfloor$=1
ASI=actualservice(1, 1)=$2*((\lfloor 2*2^{-1} \rfloor+1)*2^1-\lfloor 2*2^- \rfloor*2^1)$=4
RSI(s0)=4-4=0
Session s0 is enqueued in the NSL[0] of group SG1. The result is shown in FIG. 7b.

Figure 7C:
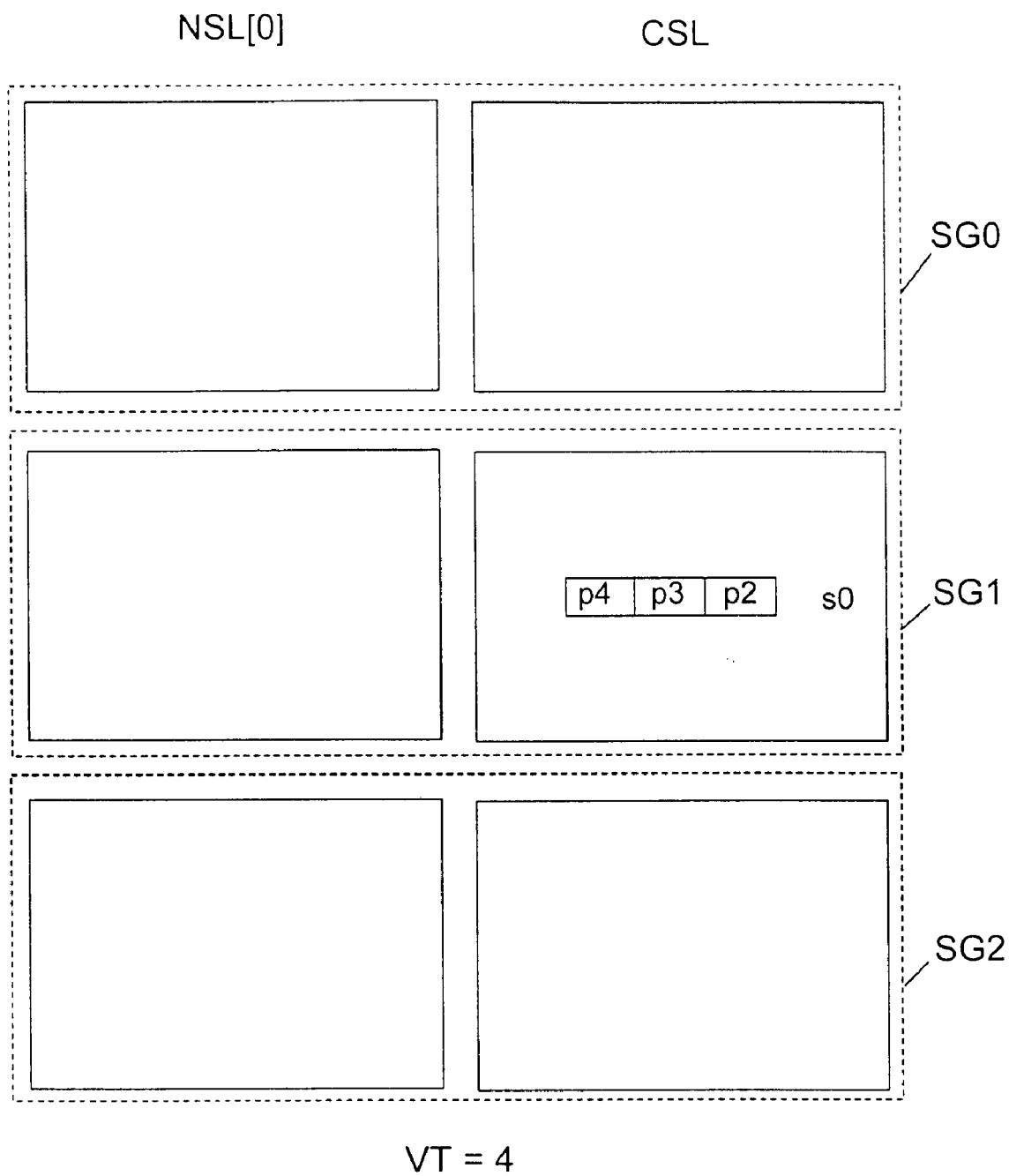

/ procedure update VT with VTF( ) /
VT is updated with VTF:
g=1; SG1 is the first group with non-empty CSL or NSL[0]
VTg=$(\lfloor T*2^{-1} \rfloor+1)*2^1$=(1+1)*2=4
VT is equal to 2; VT+VTF=2+2=4
Lastg=2
NewVT=4
VTF=2-(4-2)=0
VT=4
NSL(SG0)[0] is swapped to CSL(SG0) and NSL(SG0)[0] is emptied
NSL(SG1)[0] is swapped to CSL(SG1) and NSL(SG1)[0] is emptied
NSL(SG2)[0] is swapped to CSL(SG2) and NSL(SG2)[0] is emptied
The result is shown in FIG. 7c.

Figure 7D:
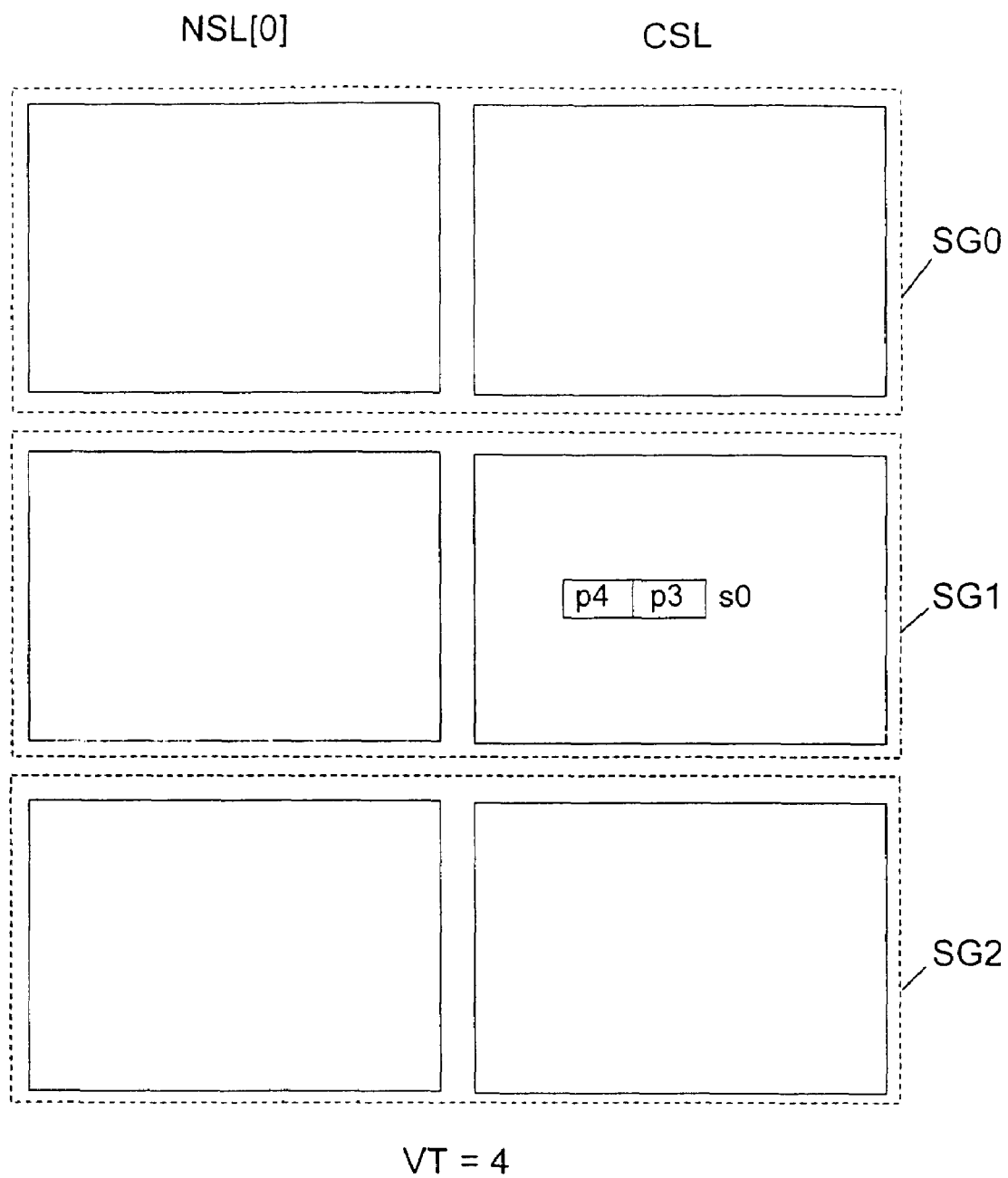

/ procedure scheduler /
g=1; SG1 is the fastest (and the only) group with CSL non-empty.
There is only one session s0 in SG1 from which packets need to be transmitted. This session s0 is selected.
RSI(s0)=0
Packet p2 is dequeued from s0, its length is obtained, and VTF=0+320/(80*2)=2.
Packet p2 is transmitted, and packet p3 becomes the next packet to be transmitted, as shown in FIG. 7d.
Phi=320/80=4[s].
RSI(s0)=0+4=4[s].
Newg=findgroup (4)=$\lfloor \log_2(4/2) \rfloor$=$\lfloor \log_2 \rfloor$=1
ASI=actualservice                                    (1, 1)=$2*((\lfloor 4*2^{-1} \rfloor+1)*2^1-\lfloor 4*2^{-1} \rfloor*2^1)$=4

Figure 7E:
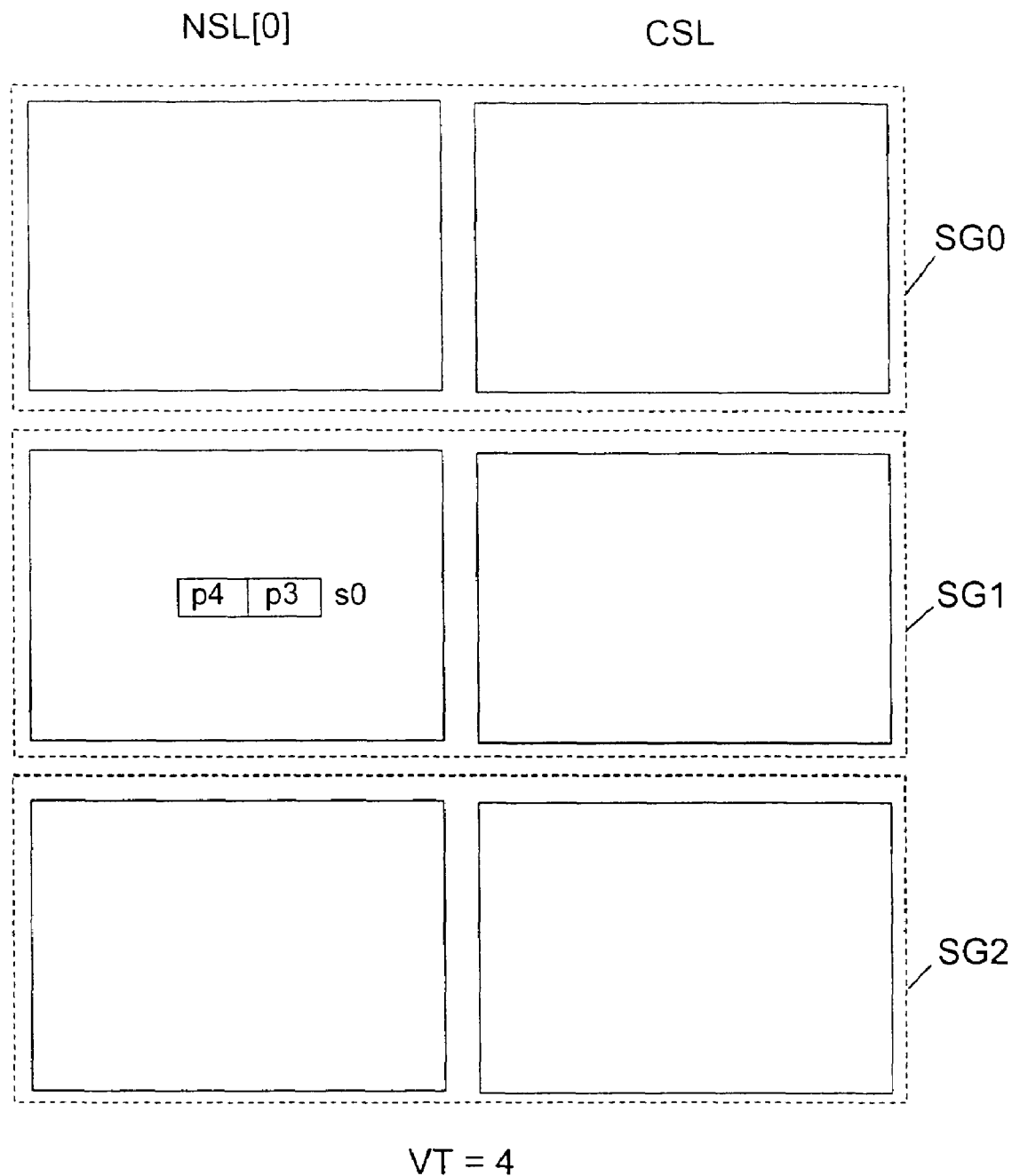

RSI(s0)=4−4=0
Session s0 is enqueued in the NSL[0] of group SG1. The result is shown in FIG. 7e.

Figure 7F:
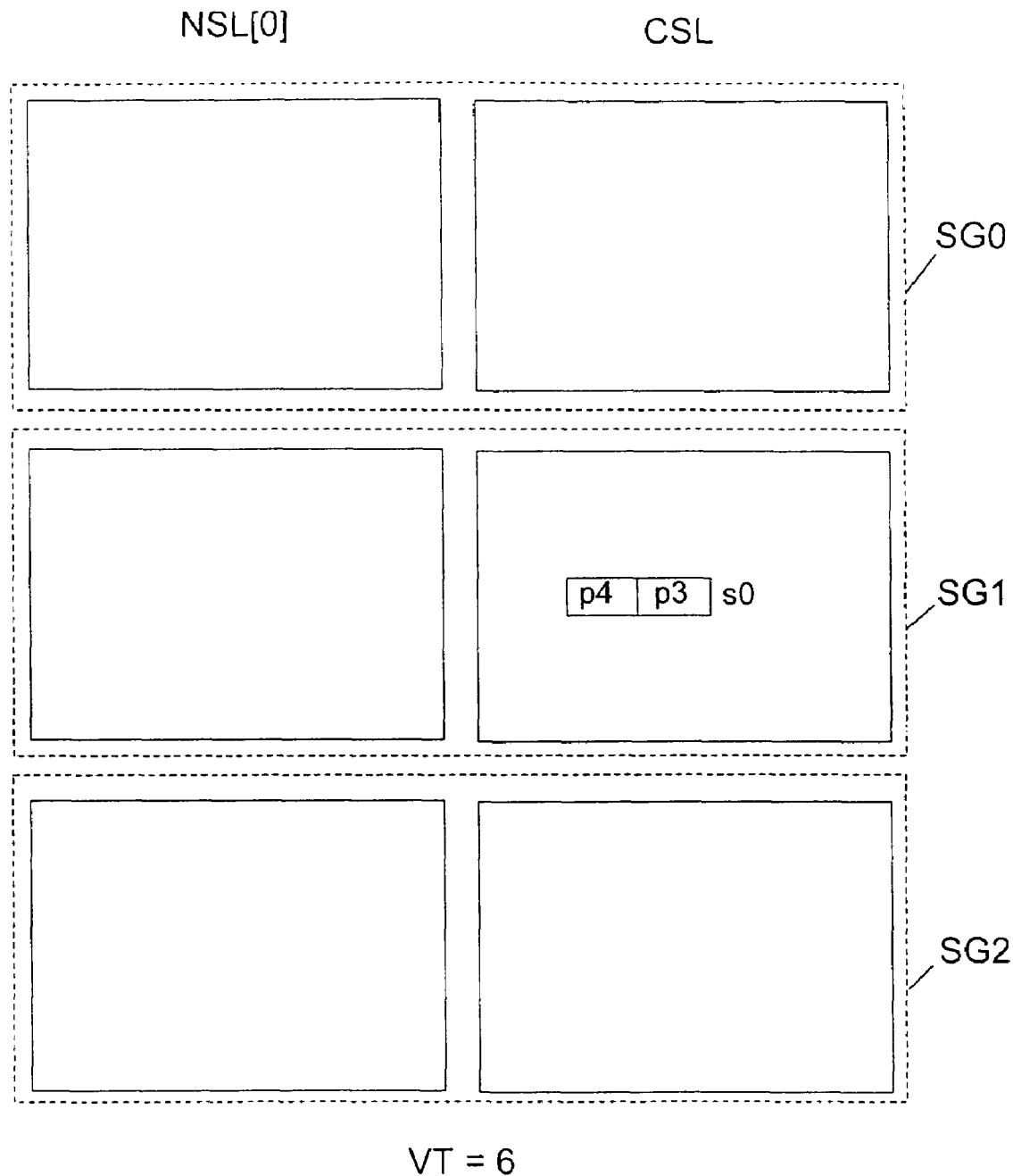

/ procedure update VT with VTF( ) /
VT is updated with VTF:
  g=1; SG1 is the first group with non-empty CSL or NSL[0]
  VTg=($\lfloor VT*2^{-1} \rfloor$+1)*$2^1$=(2+1)*2=6
  VT is equal to 4; VT+VTF=4+2=6
  Lastg=1
  NewVT=6
  VTF=2−(6−4)=0
  VT=6
  NSL(SG0)[0] is swapped to CSL(SG0) and NSL(SG0)[0] is emptied
  NSL(SG1)[0] is swapped to CSL(SG1) and NSL(SG1)[0] is emptied
  The result is shown in FIG. 7f.

Figure 8A:
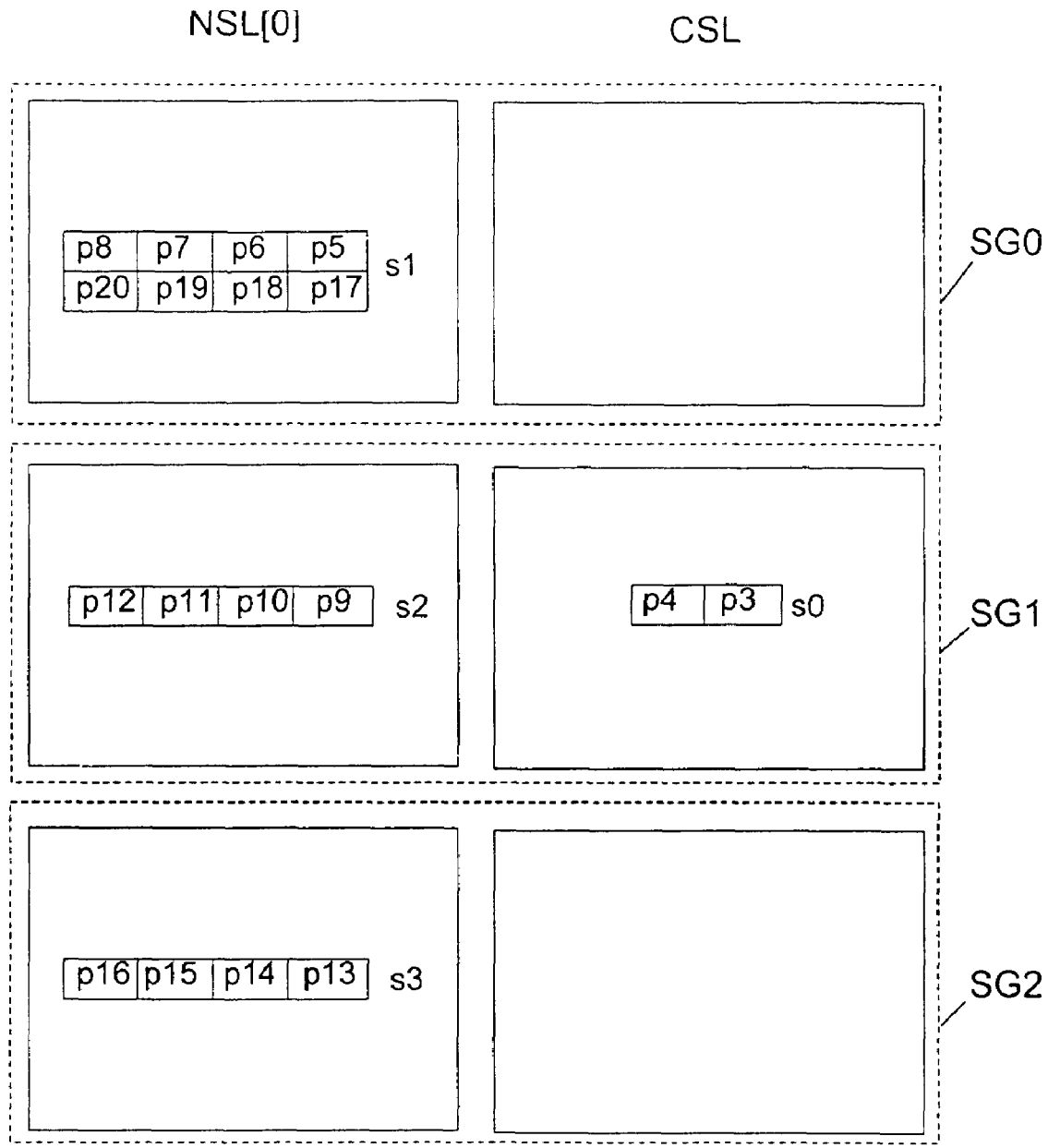

/ procedure HDRRenque /
In the mean time, other packets have been received as shown in FIG. 8a.
packets p5 to p8 and p17 to p20 from session s1 with rate R1=160 B/s
packets p9 to p12 from session s2 with rate R2=80 B/s
packets p13 to p16 from session s3 with rate R3=40 B/s
Packet p5 is enqueued in session s1
TotalRate=80+160=240
Phi=320/160=2
RSI(s1)=0; initialised as such for the very first packet of a session
RSI(s1)=0+2=2
Group=$\lfloor \log_2(2/2) \rfloor$=0; session s1 will be entered into SG0
ASI=2*$2^0$=2
RSI(s1)=2−2=0
s1 is enqueued in NSL[0] of SG0.
Packet p6 belonging to session s1 arrives and is enqueued in session s1.
Packet p7 belonging to session s1 arrives and is enqueued in session s1.
Packet p8 belonging to session s1 arrives and is enqueued in session s1.
The result is shown in FIG. 8a.
Packet p9 is enqueued in session s2
TotalRate=240+80=320
Phi=320/80=4
RSI(s2)=0; initialised as such for the very first packet of a session
RSI(s2)=0+4=4
Group=$\lfloor \log_2(4/2) \rfloor$=1; session s2 will be entered into SG1
ASI=2*$2^1$=4
RSI(s2)=4−4=0
s2 is enqueued in NSL[0] of SG1.
Packet p10 belonging to session s2 arrives and is enqueued in session s2.
Packet p11 belonging to session s2 arrives and is enqueued in session s2.
Packet p12 belonging to session s2 arrives and is enqueued in session s2.
The result is shown in FIG. 8a.
Packet p13 is enqueued in session s3
TotalRate=320+40=360
Phi=320/40=8
RSI(s3)=0; initialised as such for the very first packet of a session
RSI(s3)=0+8=8
Group=$\lfloor \log_2(8/2) \rfloor$=2; session s3 will be entered into SG2

ASI=2*$2^2$=8
RSI(s3)=8−8=0
S3 is enqueued in NSL[0] of SG2.
Packet p14 belonging to session s3 arrives and is enqueued in session s3.
Packet p15 belonging to session s3 arrives and is enqueued in session s3.
Packet p16 belonging to session s3 arrives and is enqueued in session s3.
The result is shown in FIG. 8a.
Packet p17 belonging to session s1 arrives and is enqueued in session s1.
Packet p18 belonging to session s1 arrives and is enqueued in session s1.
Packet p19 belonging to session s1 arrives and is enqueued in session s1.
Packet p20 belonging to session s1 arrives and is enqueued in session s1.
The result is shown in FIG. 8a.

Figure 8B:
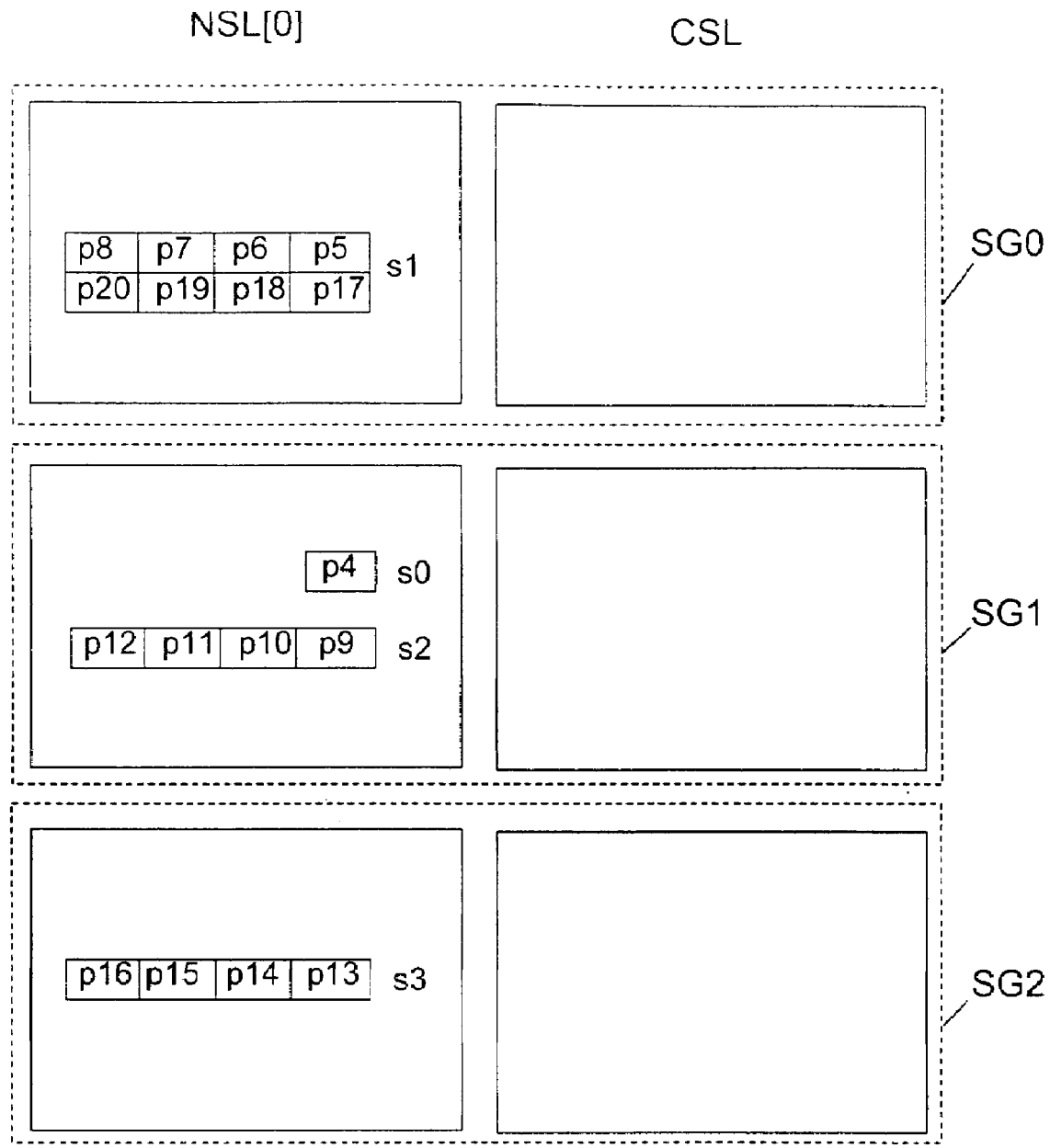

/ procedure scheduler /
The scheduler starts all over again, starting with the situation of FIG. 8a.
g=1; SG1 is the fastest (and the only) group with CSL non-empty.
There is only 1 session s0 in SG1 from which packets need to be transmitted. This session s0 is selected.
RSI(s0)=0
Packet p3 is dequeued from s0, its length is obtained, and VTF=0+320/(360*2)=0.44
Packet p3 is transmitted, and packet p4 becomes the next packet to be transmitted.
Phi=320/80=4[s].
RSI(s0)=0+4=4[s].
Newg=findgroup (4) =$\lfloor \log_2(4/2) \rfloor$=$\lfloor \log_2 2 \rfloor$=1
ASI=actualservice (1, 1)=2*(($\lfloor 6*2^{-1} \rfloor$+1)*$2^1$−$\lfloor 6*2^{-1} \rfloor$*$2^1$)=4
RSI(s0)=4−4=0
Session s0 is enqueued in the NSL[0] of group SG1. The result is shown in FIG. 8b.

Figure 8C:
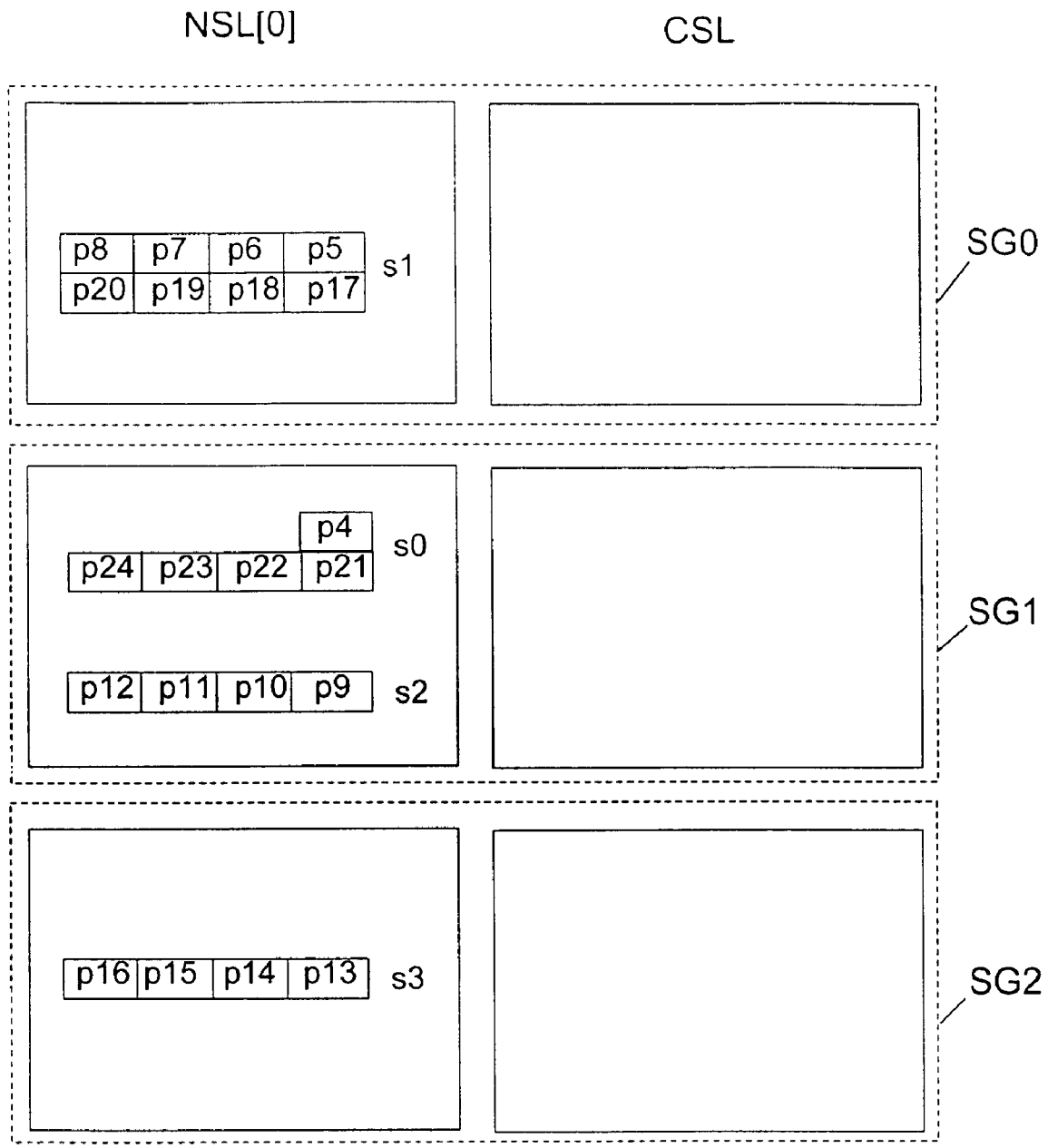

/ procedure update VT with VTF( ) /
VT is updated with VTF:
  g=0; SG0 is the first group with non-empty CSL or NSL[0]
  VTg=($\lfloor VT*2^{-0} \rfloor$+1)*$2^0$=7
  VT is equal to 6; $\lfloor VT+VTF$=$\rfloor 6+0.44 \rfloor$=6<7, so updating is stopped / procedure HDRRenque /
Packet p21 belonging to session s0 arrives and is enqueued in session s0.
Packet p22 belonging to session s0 arrives and is enqueued in session s0.
Packet p23 belonging to session s0 arrives and is enqueued in session s0.
Packet p24 belonging to session s0 arrives and is enqueued in session s0.
The result is shown in FIG. 8c.

/ procedure scheduler /
All CSL are empty, but not all NSL are empty.

/ procedure increase VT( ) /
g=0; SG0 is the first group with non-empty CSL or NSL[0]
newVT=($\lfloor 6*2^{-0} \rfloor$+1)*$2^0$=7
lastg=0
VTF=0
VT=7

Figure 9:
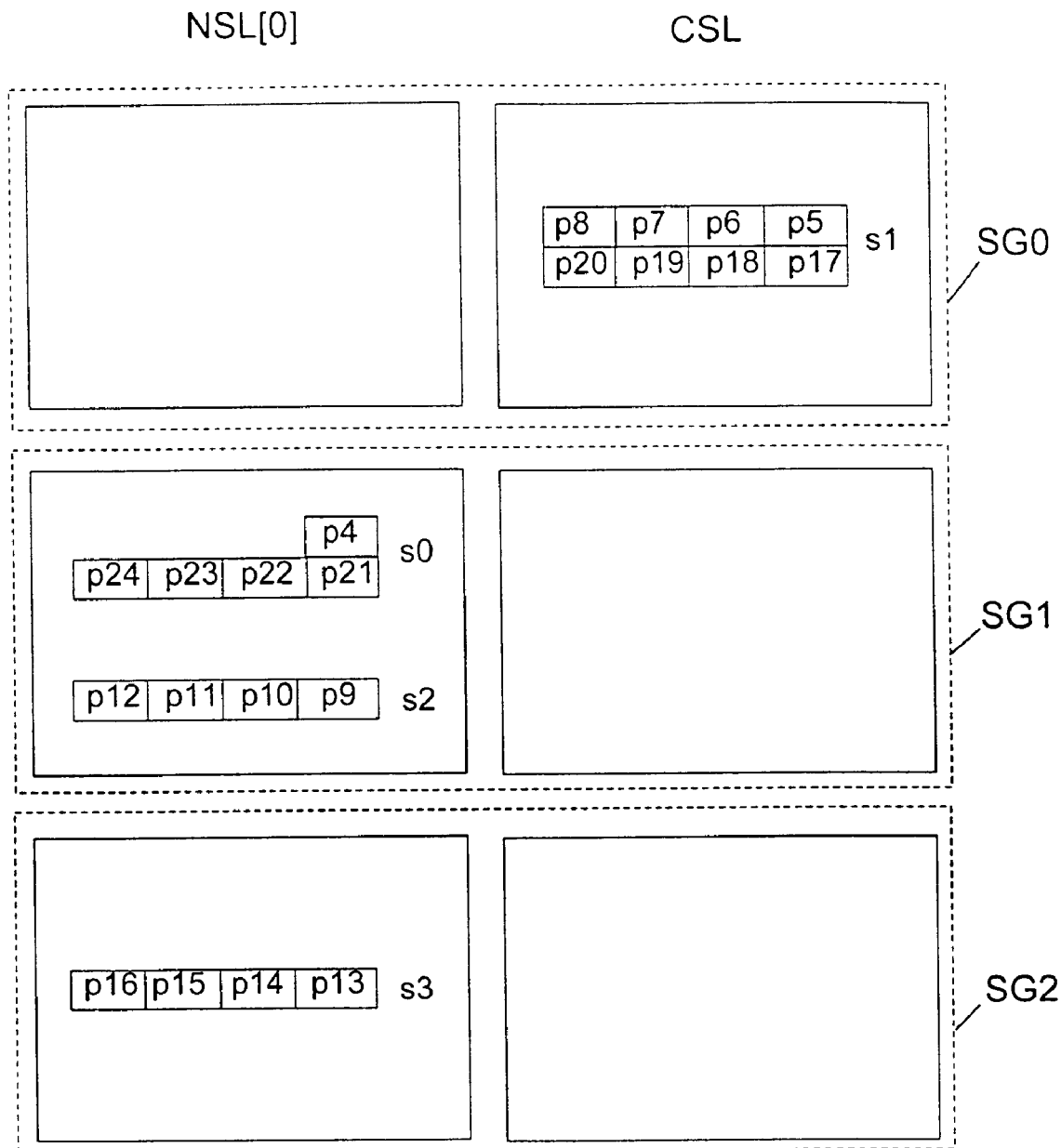
Figure 10:
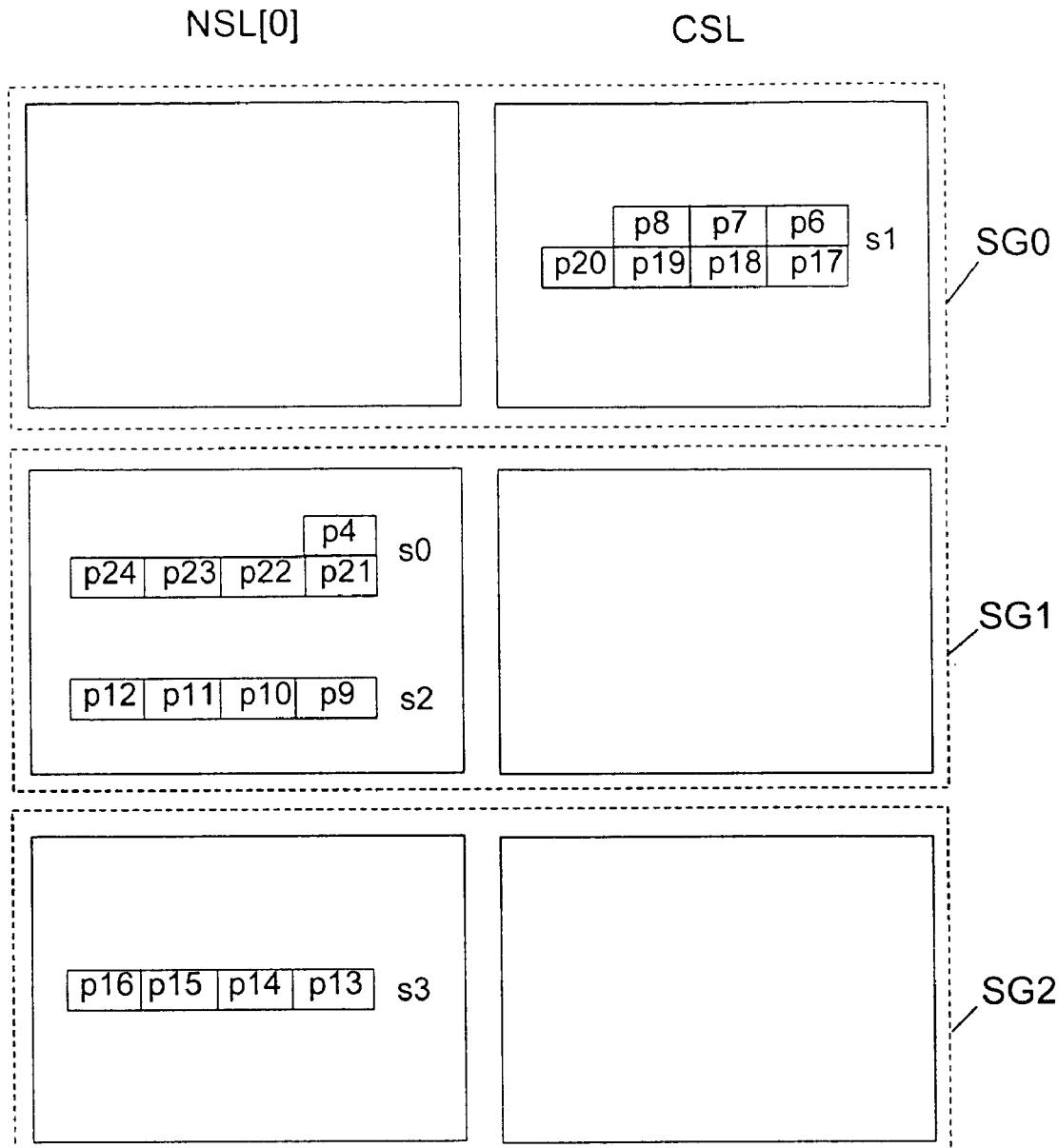
Figure 11:
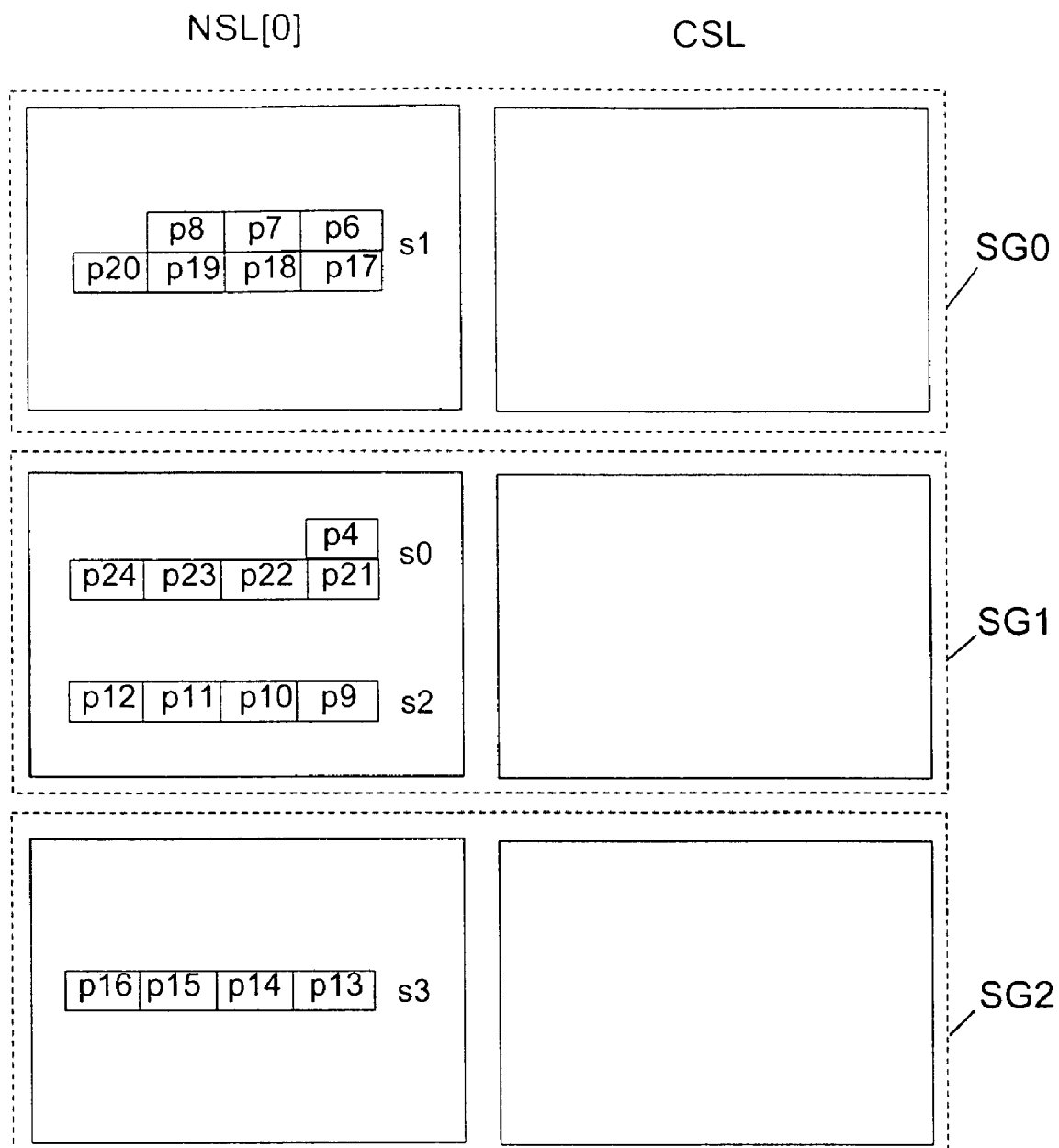

NSL(SG0)[0] is swapped to CSL(SG0) and NSL(SG0)[0] is emptied
   The result is shown in FIG. 9.
/ procedure scheduler /
   The scheduler starts all over again, starting with the situation of FIG. 9.
g=0; SG0 is the fastest group with non-empty CSL
s=s1 is considered
RSI(s1)=0
   Packet p5 is considered.
VTF=0+320/(360*2)=0.44
   Packet p5 is transmitted. The result is shown in FIG. 10. Session s1 is not idle yet.
   Packet p6 of s1 becomes the next to be transmitted. p=p6 of s1 in SG0.
Phi=320/160=2
RSI(s1)=0+2=2
Newg=$\log_2(2/2)=\log_2 1=0$
ASI=actualservice(0, 0)=$2*((\lfloor 7*2^{-0} \rfloor +1)*2^0)-\lfloor 7*2^{-0} \rfloor *2^0)=2*1=2$
RSI(s1)=2−2=0
   Session s1 is enqueued in NSL[0] of SG1. The result is shown in FIG. 11.

/ procedure update VT with VTF( ) /
VT is updated with VTF:
   g=0; SG0 is the first group with non-empty CSL or NSL
   VTg=$(\lfloor VT*2^{-0} \rfloor +1)*2^0=8$
   $\lfloor VT+VT \rfloor = \lfloor 7+0.44 \rfloor = 7 < 8$, thus updating of VT is stopped / procedure scheduler /
   All CSL are empty, but not all NSL are empty / procedure increase VT( ) /
g=0; SG0 is the fastest group with non-empty NSL[0]
newVT=$(\lfloor 7*2^{-0} \rfloor +1)*2^0=8$
lastg=3
VTF=0
VT=8
   For SG0: NSL(SG0)[0] is transferred to CSL(SG0); NSL(SG0)[0] is emptied
   For SG1: NSL(SG1)[0] is transferred to CSL(SG1); NSL(SG1)[0] is emptied
   For SG2: NSL(SG2)[0] is transferred to CSL(SG2); NSL(SG2)[0] is emptied
   The result is shown in FIG. 12.

Figure 12:
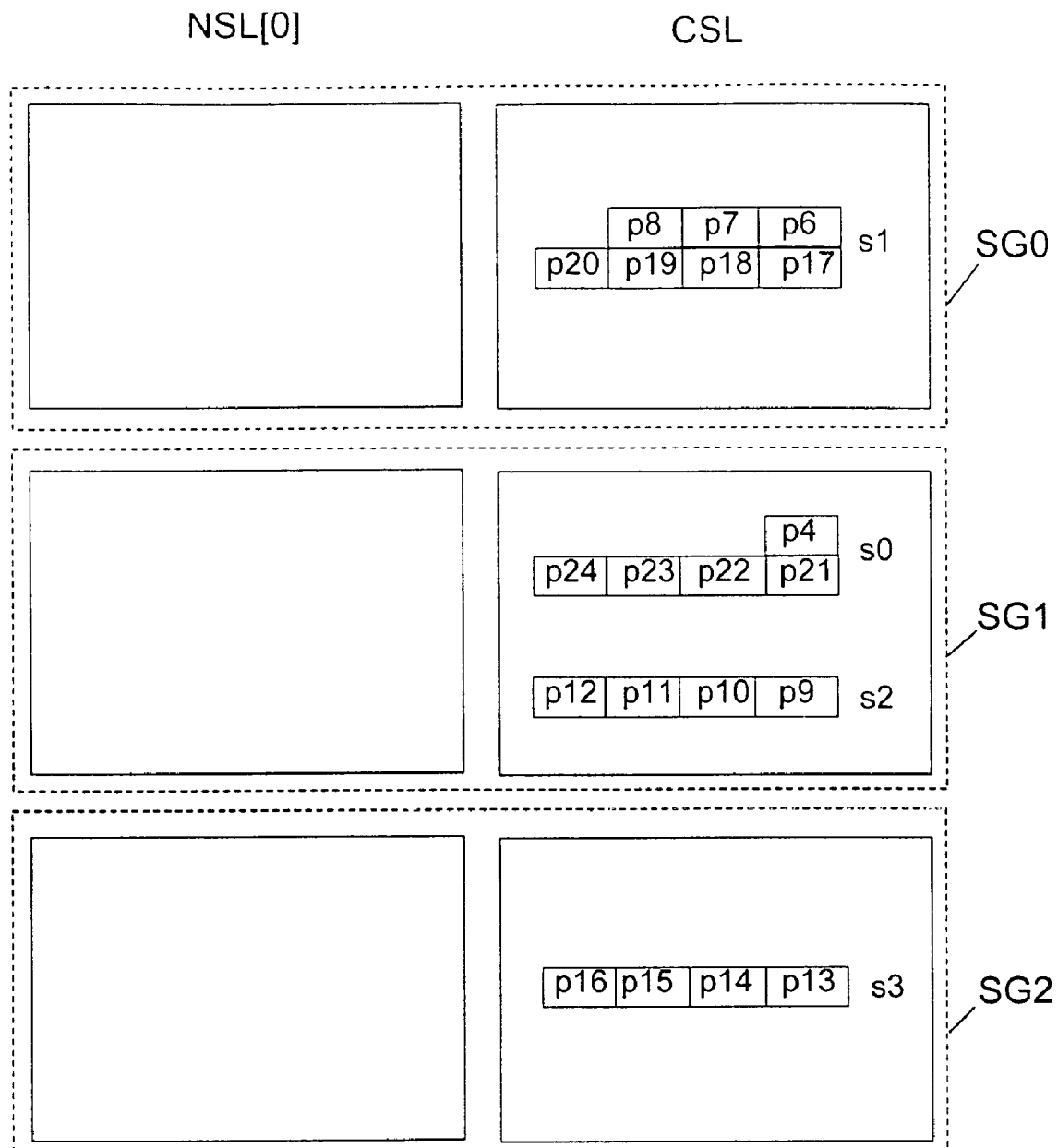
Figure 13:
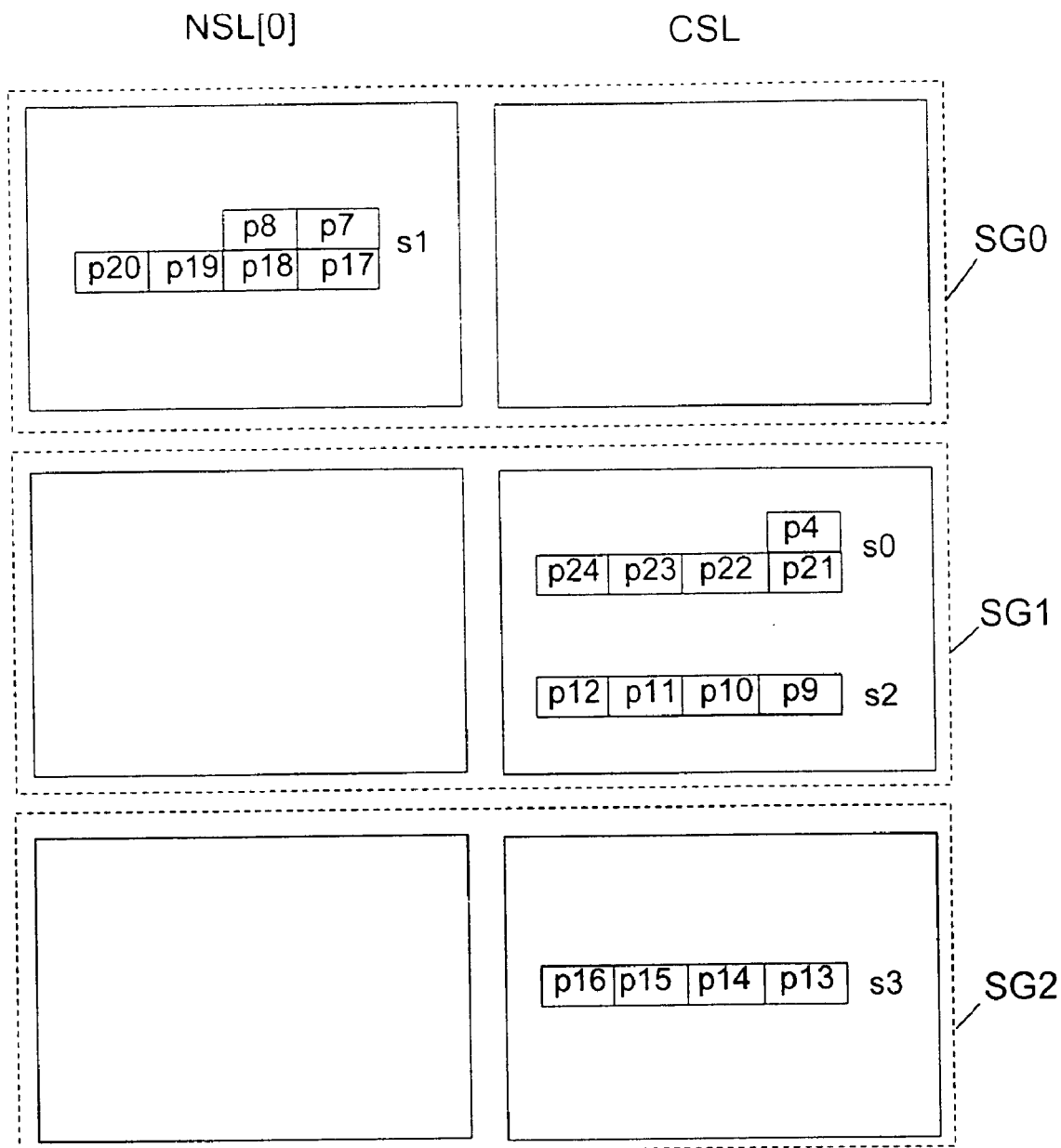

/ procedure scheduler /
   The scheduler starts all over again, starting with the situation of FIG. 12.
g=0; SG0 is the fastest group with non-empty CSL
s=s1 is considered
RSI(s1)=0
   Packet p6 is considered.
VTF=0+320/(360*2)=0.44
   Packet p6 is transmitted. Session s1 is not idle yet. Packet p7 of s1 becomes the next to be transmitted. p=p7 of s1 in SG0.
Phi=320/160=2
RSI(s1)=0+2=2
Newg=1092(2/2)=0
   ASI=actualservice (0, 0)=$2*((\lfloor 8*2^{-0} \rfloor +1)*2^0)-\lfloor 8*2^{-0} \rfloor *2^0)=2$
RSI(s1)=2−2=0
   Session s1 is enqueued in NSL[0] of SG1. The result is shown in FIG. 13.

Figure 14:
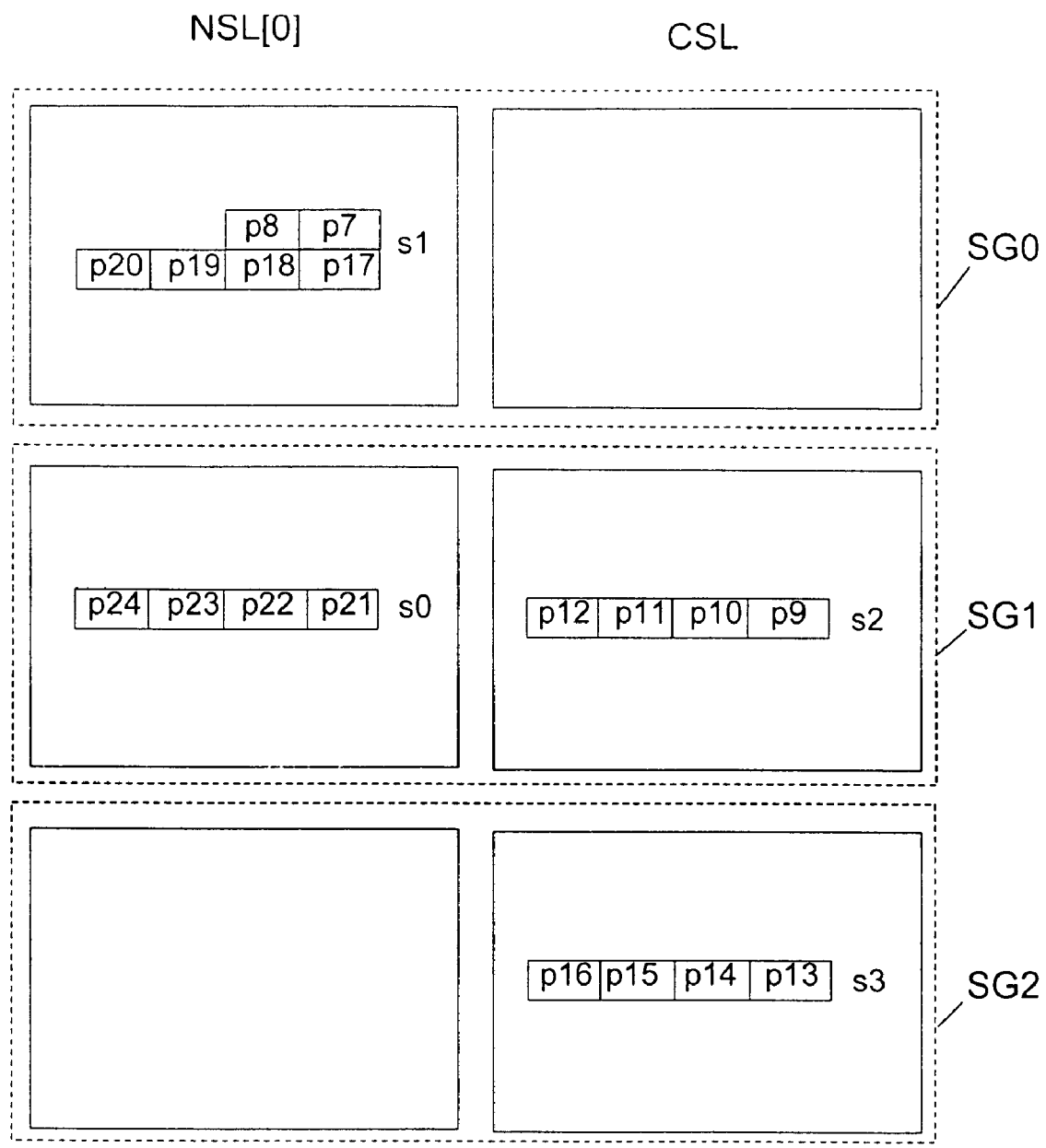

/ procedure updateVTwithVTF( ) /
VT is updated with VTF:
   g=0; SG0 is the first group with non-empty CSL or NSL;
   VTg=$(\lfloor 8*2^{-0} \rfloor +1)*2^0=9$
   $\lfloor VT+VTF \rfloor = \lfloor 8+0.44 \rfloor = 8 < 9$, thus stop updating VT / procedure scheduler /
   The scheduler starts all over again, starting with the situation of FIG. 13.
g=1; SG1 is the fastest group with non-empty CSL
s=s0 is considered
RSI (s0)=0
   Packet p4 is considered.
VTF=0.44+320/(360*2)=0.89
   Packet p4 is transmitted. Session s0 is not idle-yet. Packet p21 of s0 becomes the next to be transmitted. p=p21 of s0 in SG1.
Phi=320/80=4
RSI(s0)=0+4=4
Newg=1092(4/2)=1
   ASI=actualservice (1, 1)=$2*((\lfloor 8*2^{-1} \rfloor +1)*2^1)-(8*2^{-1})*2^1)=4$
RSI(s0)=4−4=0
   Session s0 is enqueued in NSL[0] of SG1. The result is shown in FIG. 14.

/ procedure updateVTwithVTF( ) /
VT is updated with VTF:
   g=0; SG0 is the first group with non-empty CSL or NSL[0];
   VTg=$(\lfloor 8*2^{-0} \rfloor +1)*2^0=9$
   $\lfloor VT+VTF \rfloor = \lfloor 8+0.89 \rfloor = 8 < 9$, thus updating of VT is stopped / procedure scheduler /
   The scheduler starts all over again, starting with the situation of FIG. 14.
g=1; SG1 is the fastest group with non-empty CSL
s=s2 is considered
RSI (s2)=0
   Packet p9 is considered.
VTF=0.89+320/(360*2)=1.33
   Packet p9 is transmitted. Session s2 is not idle yet. Packet p10 of s2 becomes the next to be transmitted. p=p10 of s2 in SG1.
Phi=320/80=4
RSI(s0)=0+4=4
Newg=$\log_2(4/2)=1$
   ASI=actualservice (1, 1)=$2*((\lfloor 8*2^{-1} \rfloor +1)*2^1)-(8*2^{-1})*2^1)=4$
RSI(s0)=4−4=0
   Session s2 is enqueued in NSL[0] of SG1. The result is shown in FIG. 15a.

/ procedure update VT with VTF( ) /
VT is updated with VTF:
   g=0; SG0 is the first group with non-empty CSL or NSL[0]
   VTg=$(\lfloor 8*2^{-1} \rfloor +1)*2^1=(4+1)*2=10$
   $\lfloor VT+VTF \rfloor = \lfloor 8+1.33 \rfloor = 9 < 10$, thus updating of VT is stopped.

Figure 15A:
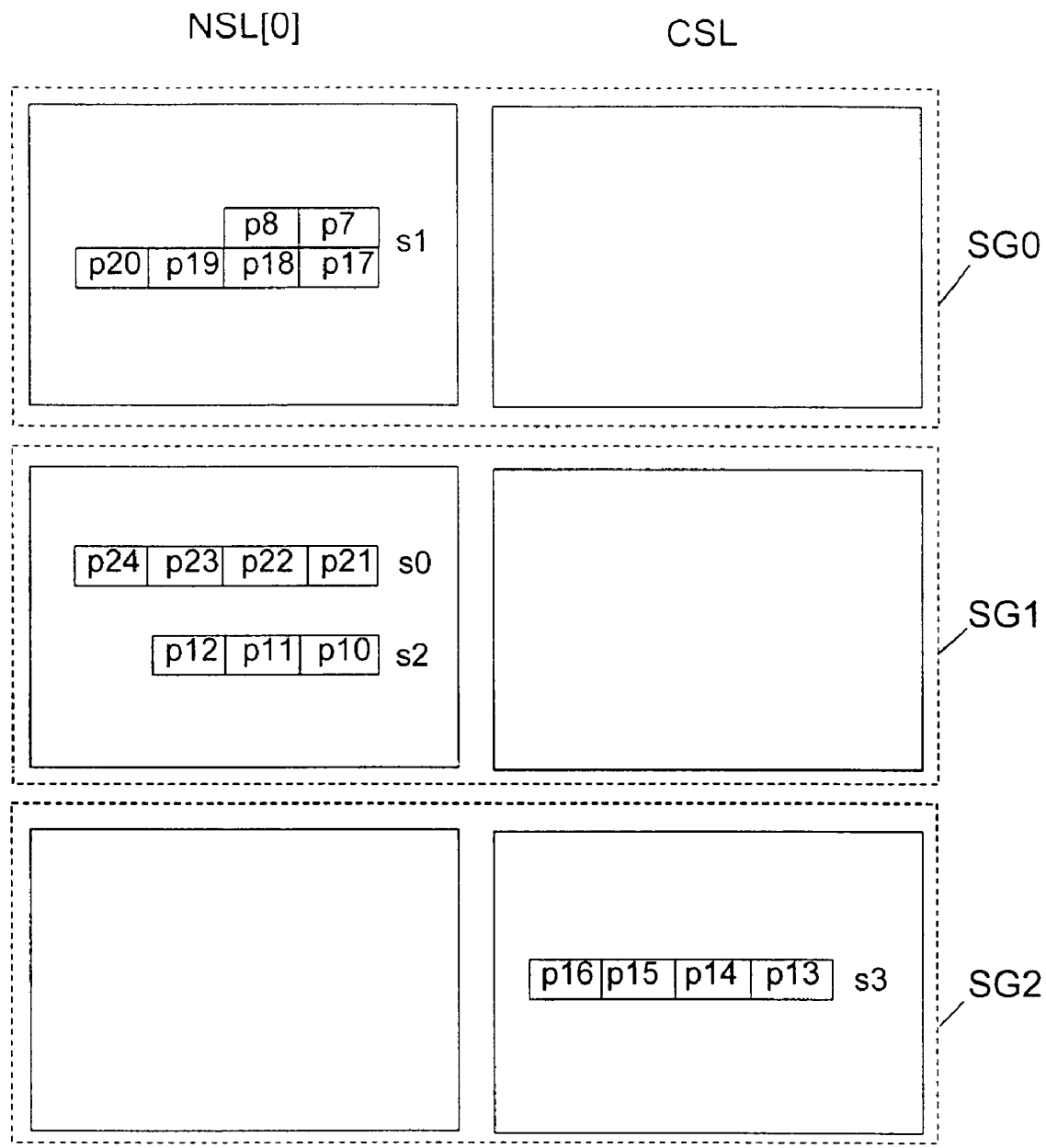

/ procedure scheduler /
   The scheduler starts all over again, starting with the situation of FIG. 15a.
g=2; SG2 is the fastest group with non-empty CSL
s=s3 is considered
RSI (s3)=0

Figure 15B:
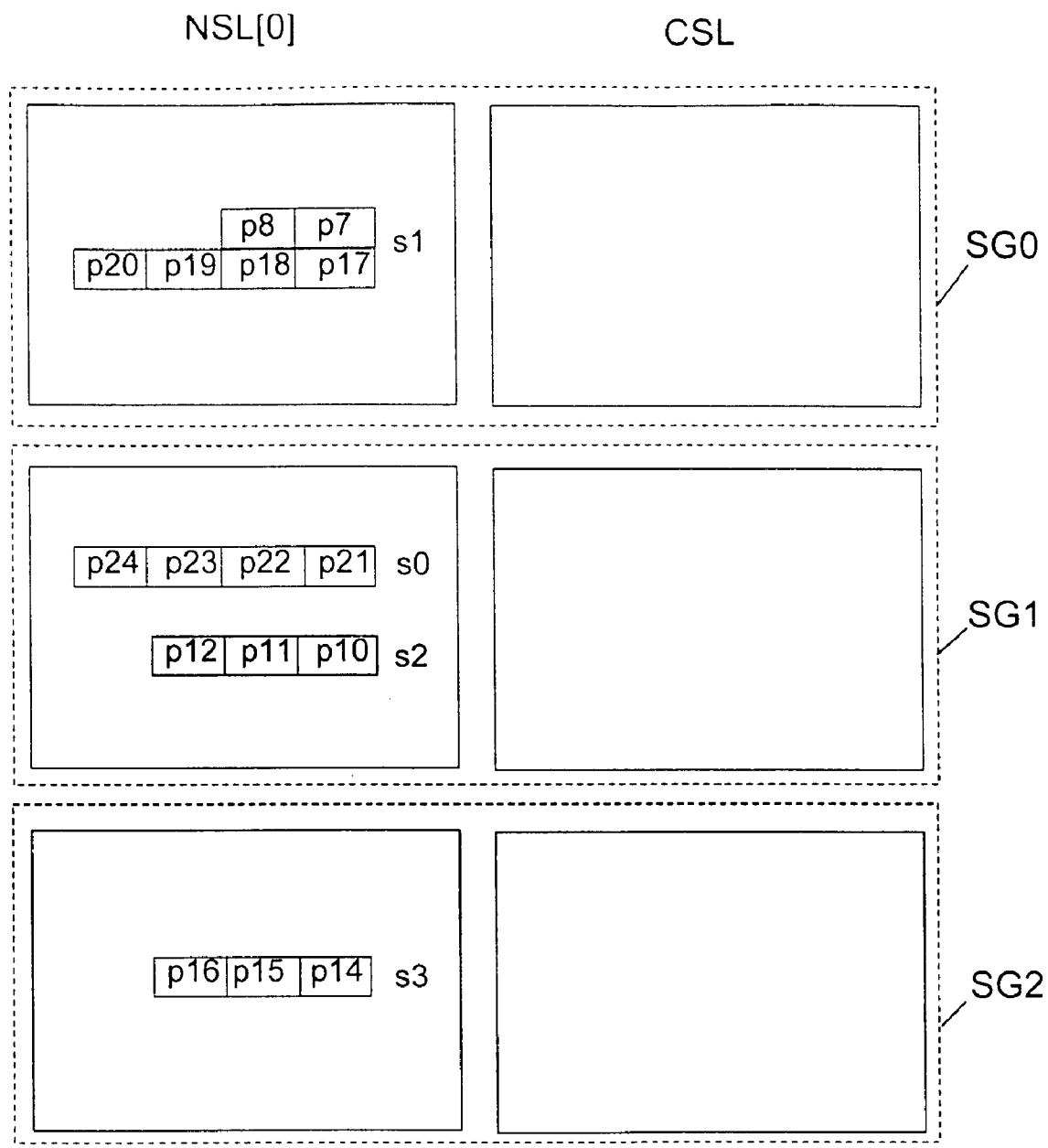

Packet p13 is considered.
VTF=1.33+320/(360*2)=1.78
Packet p13 is transmitted. Session s3 is not idle yet. Packet p14 of s3 becomes the next to be transmitted. p=p14 of s3 in SG2.
Phi=320/160=2
RSI(s1)=0+2=2
Newg=$\log_2(2/2)$=0
ASI=actualservice (0, 0)=$2*((\lfloor 8*2^{-0} \rfloor +1)*2^0)-(8*2^{-0})*2^0)$=2
RSI(s1)=2−2=0
Session s3 is enqueued in NSL[0] of SG2. The result is shown in FIG. 15b.

/ procedure updateVTwithVTF( ) /
VT is updated with VTF:
g=0; SG0 is the first group with non-empty CSL or NSL[0];
VTg=$(\lfloor 8*2^{-0} \rfloor +1)*2^0$=9
$\lfloor VT+VTF \rfloor = \lfloor 8+1.78 \rfloor$=9
lastg=0
newVT=9
VTF=1.78−(9−8)=0.78
VT=9
NSL(SG0)[0] is swapped to CSL(SG0) and NSL(SG0)[0] is emptied. The result is shown in FIG. 15c.

Figure 15C:
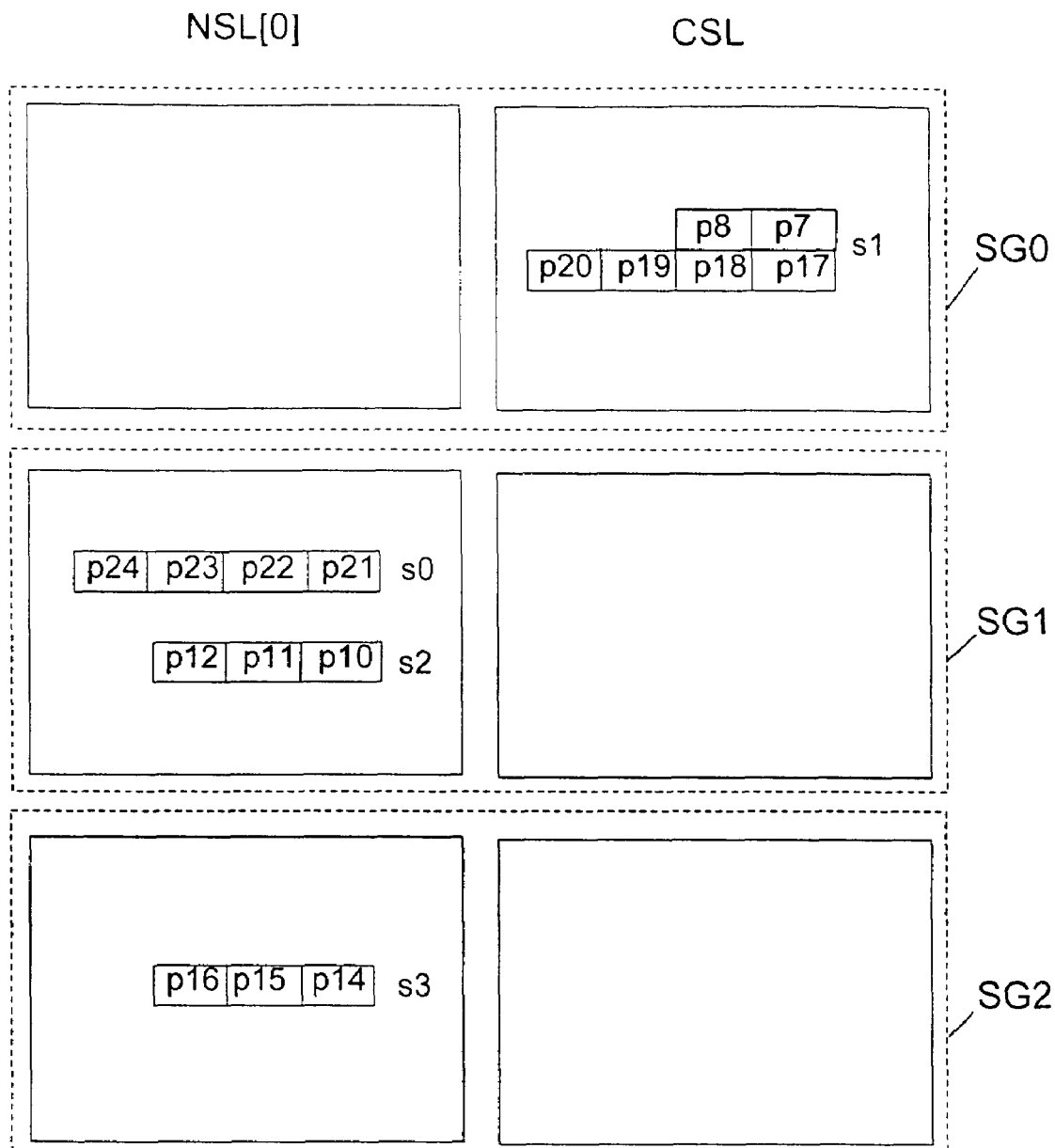
Figure 15D:
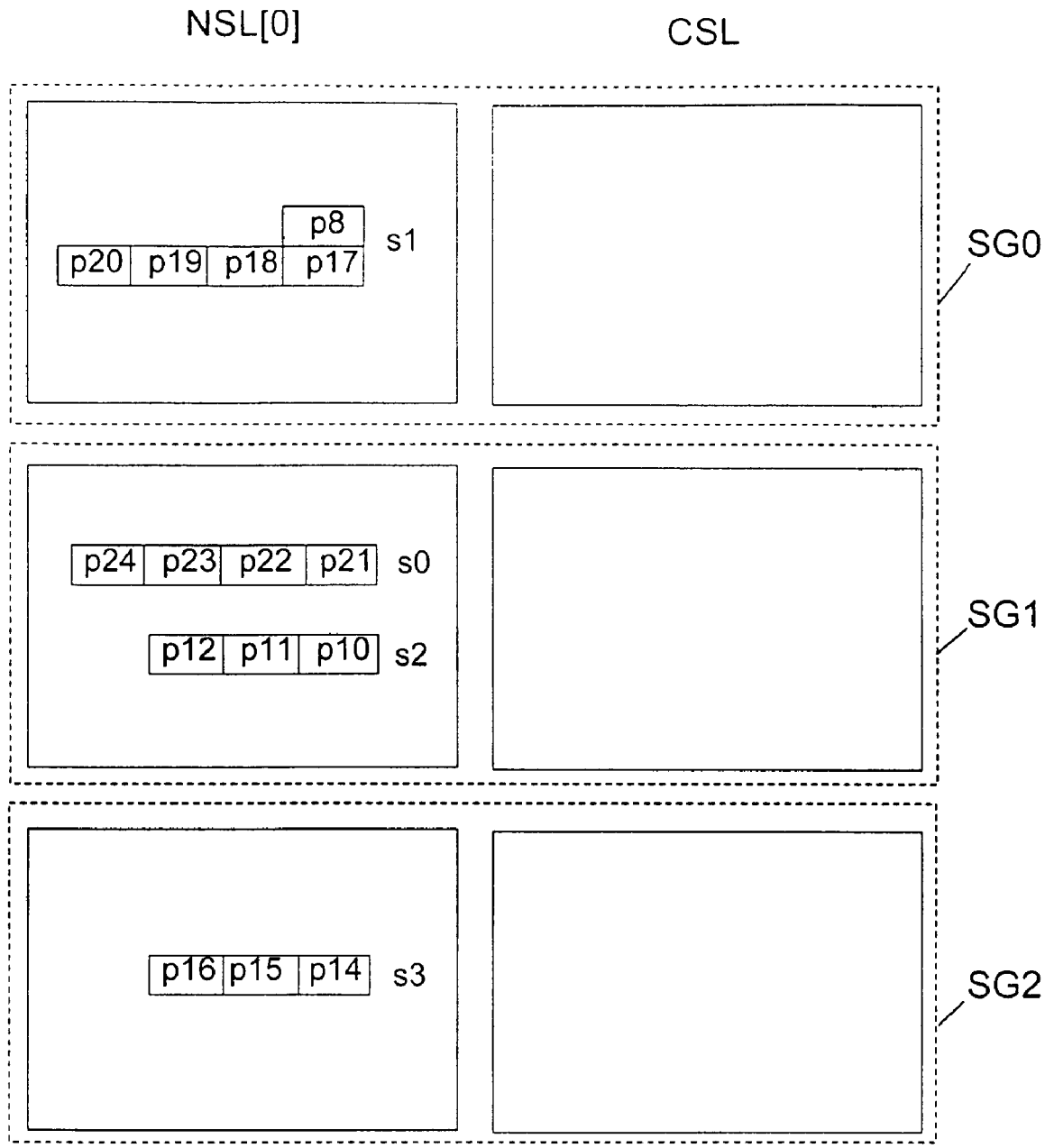

/ procedure scheduler /
The scheduler starts all over again, starting with the situation of FIG. 15c.
g=0; SG0 is the fastest group with non-empty CSL
s=s1 is considered
RSI(s1)=0
Packet p7 is considered.
VTF=0.78+320/(360*2)=1.22
Packet p7 is transmitted. Session s1 is not idle yet. Packet p8 of s1 becomes the next to be transmitted. p=p8 of s1 in SG0.
Phi=320/160=2
RSI(s1)=0+2=2
Newg=$\log_2(2/2)$=0
ASI=actualservice (0, 0)=$2*((\lfloor 9*2^{-0} \rfloor +1)*2^0)-\lfloor 9*2^{-0} \rfloor *2^0)$=2
RSI(s1)=2−2=0
Session s1 is enqueued in NSL[0] of SG1. The result is shown in FIG. 15d.

/ procedure updateVTwithVTF( ) /
VT is updated with VTF:
g=0; SG0 is the first group with non-empty CSL or NSL[0];
VTg=$(\lfloor 9*2^0 \rfloor +1)*2^0$=10
$\lfloor VT+VTF \rfloor = \lfloor 9+1.22 \rfloor$=10
Lastg=1
N wVT=10
VTF=1.22−(10−9)=0.22
VT=10
For SG0: NSL(SG0)[0] is transferred to CSL(SG0); NSL(SG0)[0] is emptied
For SG1: NSL(SG1)[0] is transferred to CSL(SG1); NSL(SG1)[0] is emptied
The result is shown in FIG. 15e.

Figure 15E:
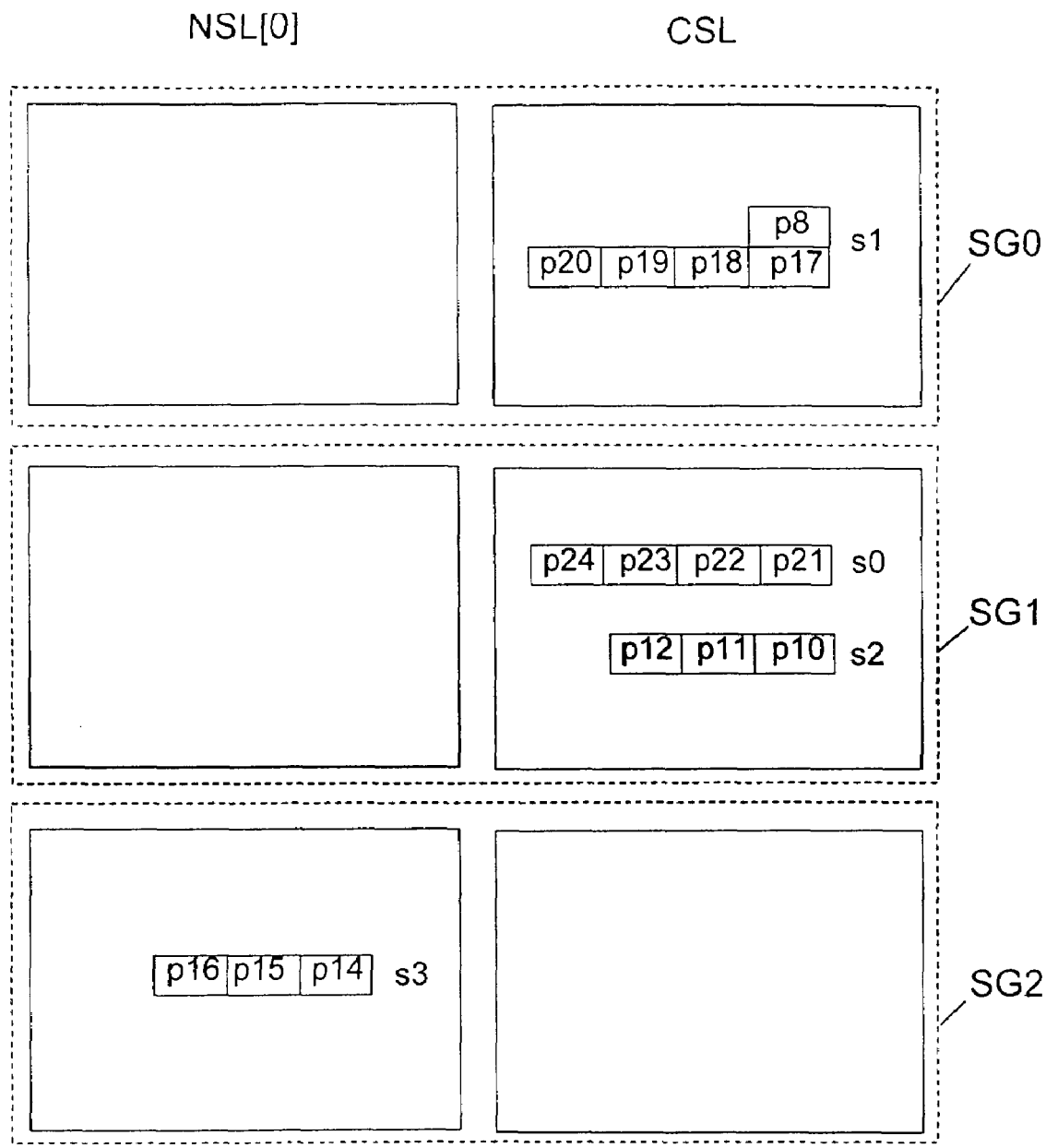

/ procedure scheduler /
The scheduler starts all over again, starting with the situation of FIG. 15e.
g=0; SG0 is the fastest group with non-empty CSL
s=s1 is considered
RSI (s1)=0

Packet p8 is considered.
VTF=0.22+320/(360*2)=0.67
Packet p8 is transmitted. Session s1 is not idle yet. Packet p17 of s1 becomes the next to be transmitted. p=p17 of s1 in SG0.
Phi=320/160=2
RSI(s1)=0+2=2
Newg=$\log_2(2/2)$=0
ASI=actualservice (0, 0)=$2*((\lfloor 10*2^{-0} \rfloor +1)*2^0)-\lfloor 10*2^{-0} \rfloor *2^0)$=2
RSI(s1)=2−2=0
Session s1 is enqueued in NSL[0] of SG1. The result is shown in FIG. 15f.

/ procedure updateVTwithVTF( ) /
VT is updated with VTF:
g=0; SG0 is the first group with non-empty CSL or NSL;
VTg $(\lfloor 10*2^{-0} \rfloor +1)*2^0$=11
$\lfloor VT+VTF \rfloor = \lfloor 10+0.67 \rfloor$=10<11, thus updating of VT is stopped.

Figure 15F:
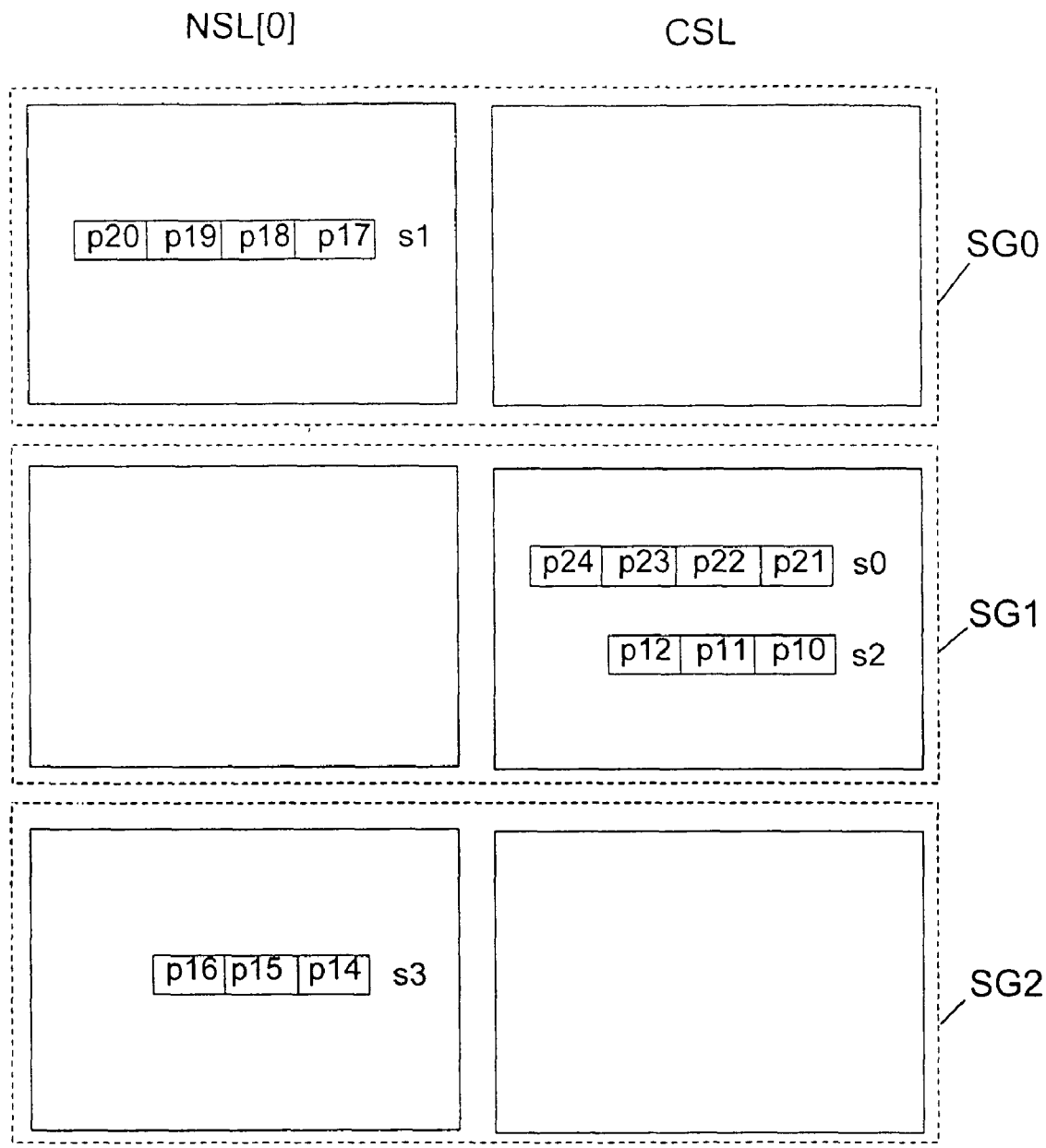
Figure 15G:
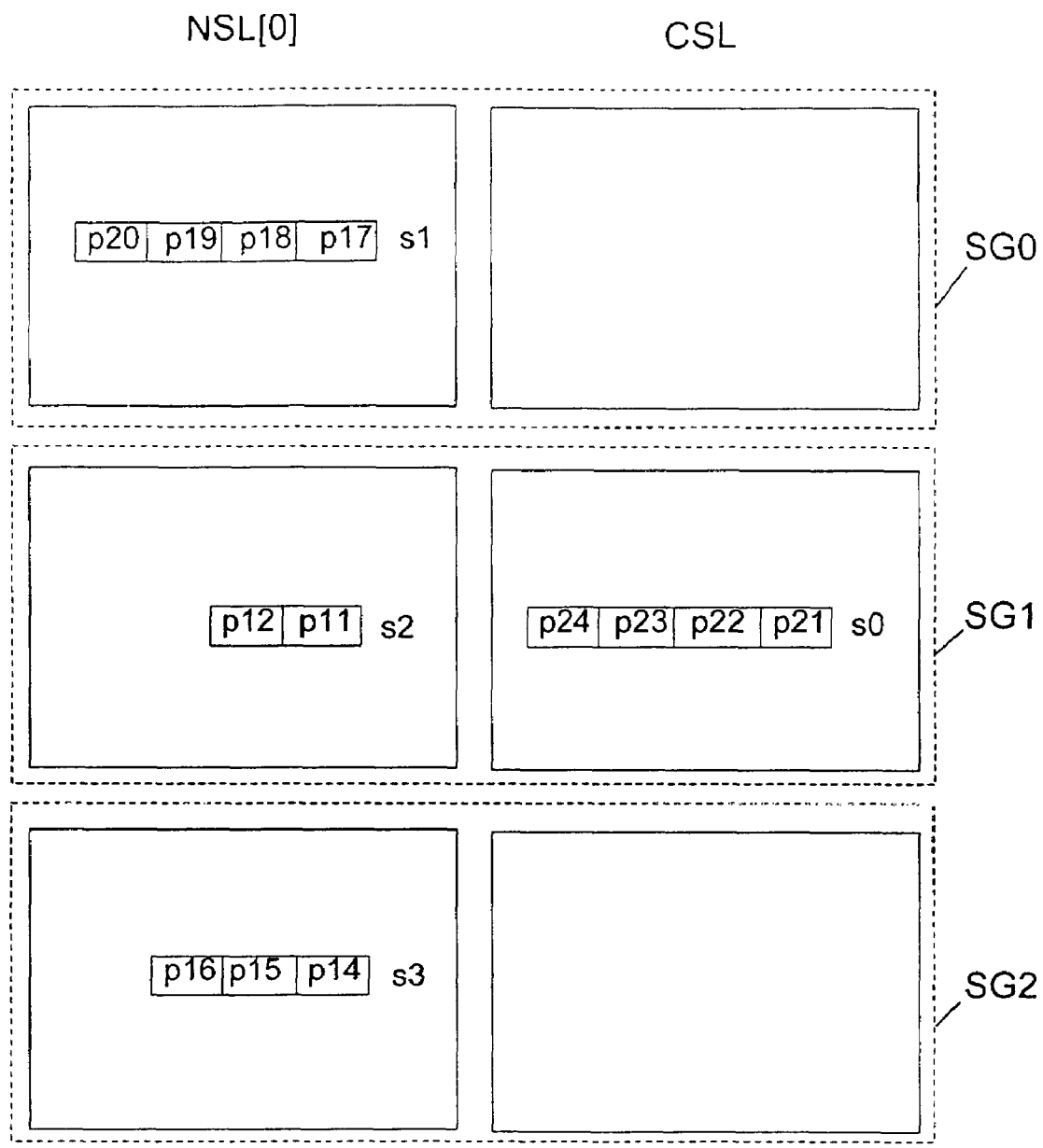

/ procedure scheduler /
The scheduler starts all over again, starting with the situation of FIG. 15f.
g=1; SG1 is the fastest group with non-empty CSL
s=s2 is (for example) considered
RSI (s2)=0
Packet p10 is considered.
VTF=0.67+320/(360*2)=1.11
Packet p10 is transmitted. Session s2 is not idle yet. Packet p11 of s2 becomes the next to be transmitted. p=p11 of s2 in SG1.
Phi=320/80=4
RSI(s2)=4
Newg=$\log_2(4/2)$=1
ASI=actualservice
(1,1)=$2*((\lfloor 10*2^{-1} \rfloor +1)*2^1)-\lfloor 10*2^{-1} \rfloor *2^0)$=4
RSI(s0)=4−4=0
Session s2 is enqueued in NSL[0] of SG1. The result is shown in FIG. 15g.

/ procedure updateVTwithVTF( ) /
VT is updated with VTF:
g=0; SG0 is the first group with non-empty CSL or NSL[0];
VTg=$(\lfloor 10*2^{-0} \rfloor +1)*2^0$=11
$\lfloor VT+VTF \rfloor = \lfloor 10+1.11 \rfloor$=11
Lastg=0
NewVT=11
VTF=1.11−(11−10)=0.11
VT=11
For SG0: NSL(SG0)[0] is transferred to CSL(SG0); NSL(SG0)[0] is emptied
The result is shown in FIG. 15h.

Figure 15H:
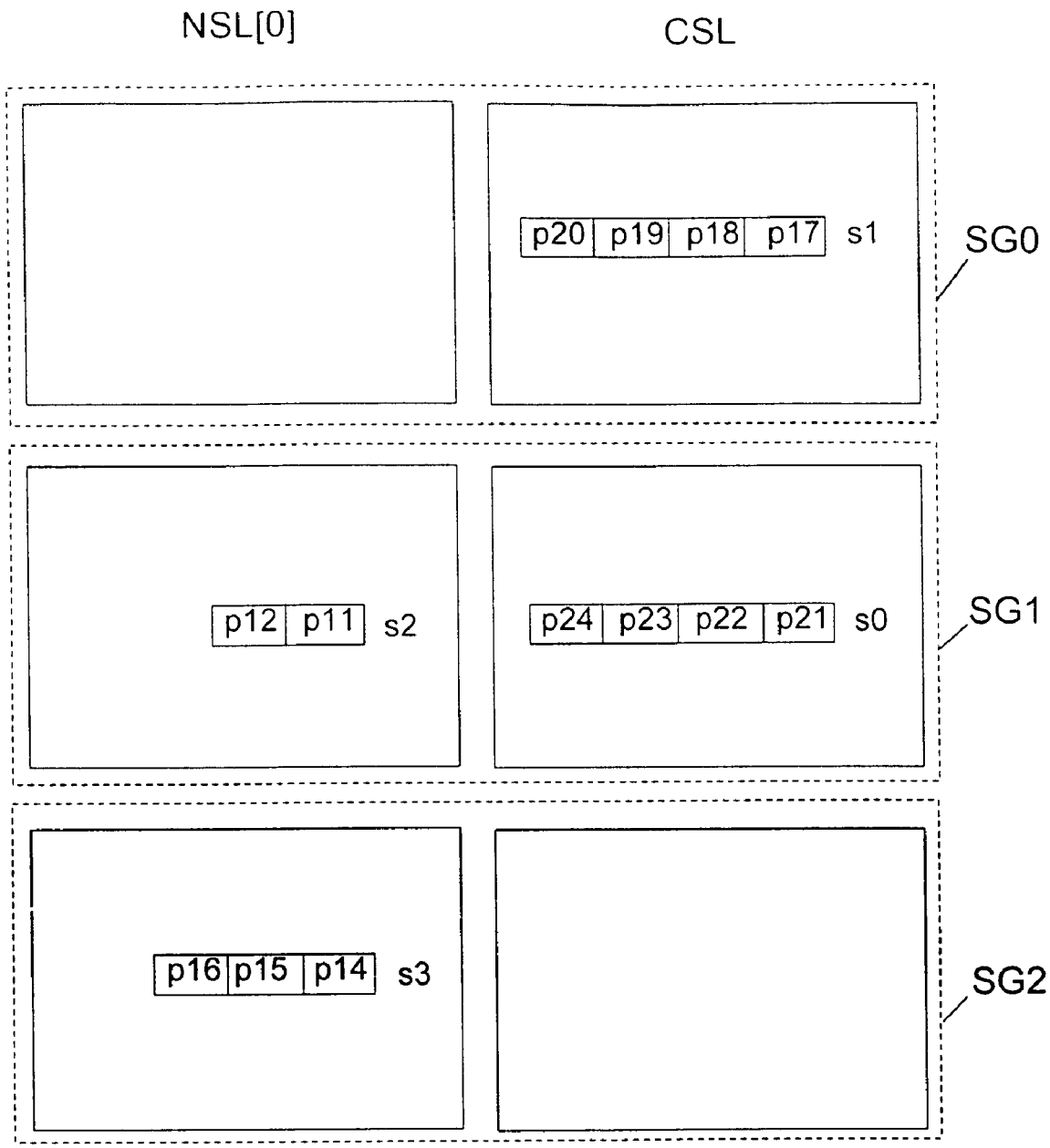

/ procedure scheduler /
The scheduler starts all over again, starting with the situation of FIG. 15h.
g=0; SG0 is the fastest group with non-empty CSL
s=s1 is considered
RSI(s1)=0
Packet p17 is considered.
VTF=0.11+320/(360*2)=0.56
Packet p17 is transmitted. Session s1 is not idle yet. Packet p18 of s1 becomes the next to be transmitted. p=p18 of s1 in SG0.
Phi=320/160=2
RSI(s1)=0+2=2
Newg=$\log_2(2/2)$=0

ASI=actualservice (0, 0)=2*(($\lfloor 11*2^{-0} \rfloor$+1)*$2^0$)−$\lfloor 11*2^{-0} \rfloor 2^0$)=2
RSI(s1)=2−2=0

Session s1 is enqueued in NSL[0] of SG1. The result is shown in FIG. 15i.

/ procedure updateVTwithVTF( ) /
VT is updated with VTF:
  g=0; SG0 is the first group with non-empty CSL or NSL[0];
  VTg=($\lfloor 11*2^{-0} \rfloor$+1)*$2^0$12
  $\lfloor$VT+VTF$\rfloor$=$\lfloor 11+0.56 \rfloor$=11<12, thus updating of VT is stopped.

Figure 15I:
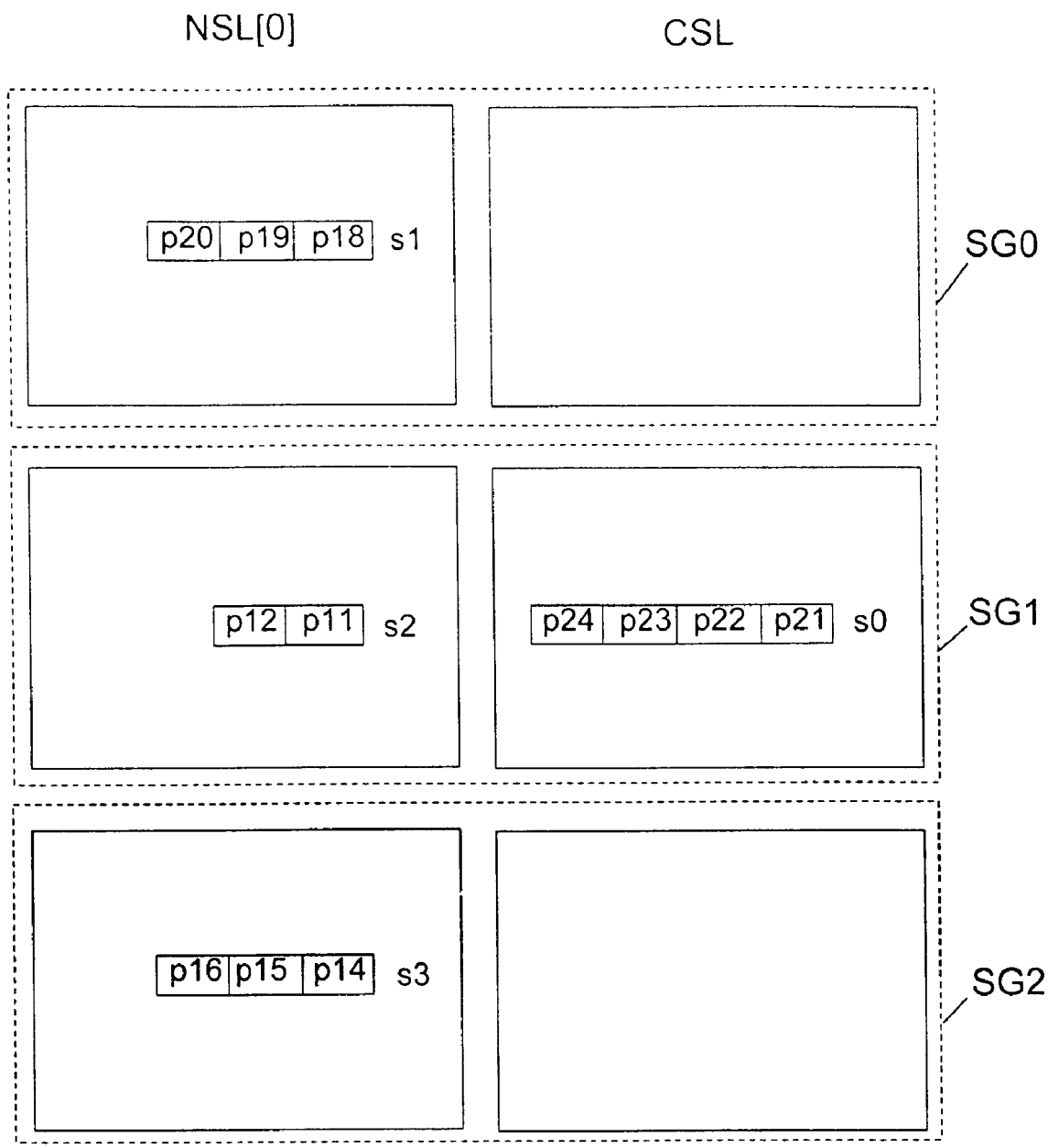

/ procedure scheduler /
The scheduler starts all over again, starting with the situation of FIG. 15i.
g=1; SG1 is the fastest group with non-empty CSL
s=s0 is considered
RSI (s0)=0
Packet p21 is considered.
VTF=0.56+320/(360*2)=1
Packet p21 is transmitted. Session s0 is not idle yet. Packet p22 of s0 becomes the next to be transmitted. p=p22 of s0 in SG0.
Phi=320/80=4
RSI(s0)=0+4=4
Newg=$\log_2$(4/2)=1
ASI=actualservice
(1,1)=2*(($\lfloor 11*2^{-1} \rfloor$+1)*$2^1$)−$\lfloor 11*2^{-1} \rfloor$*$2^1$)=4
RSI(s0)=4−4=0

Figure 16:
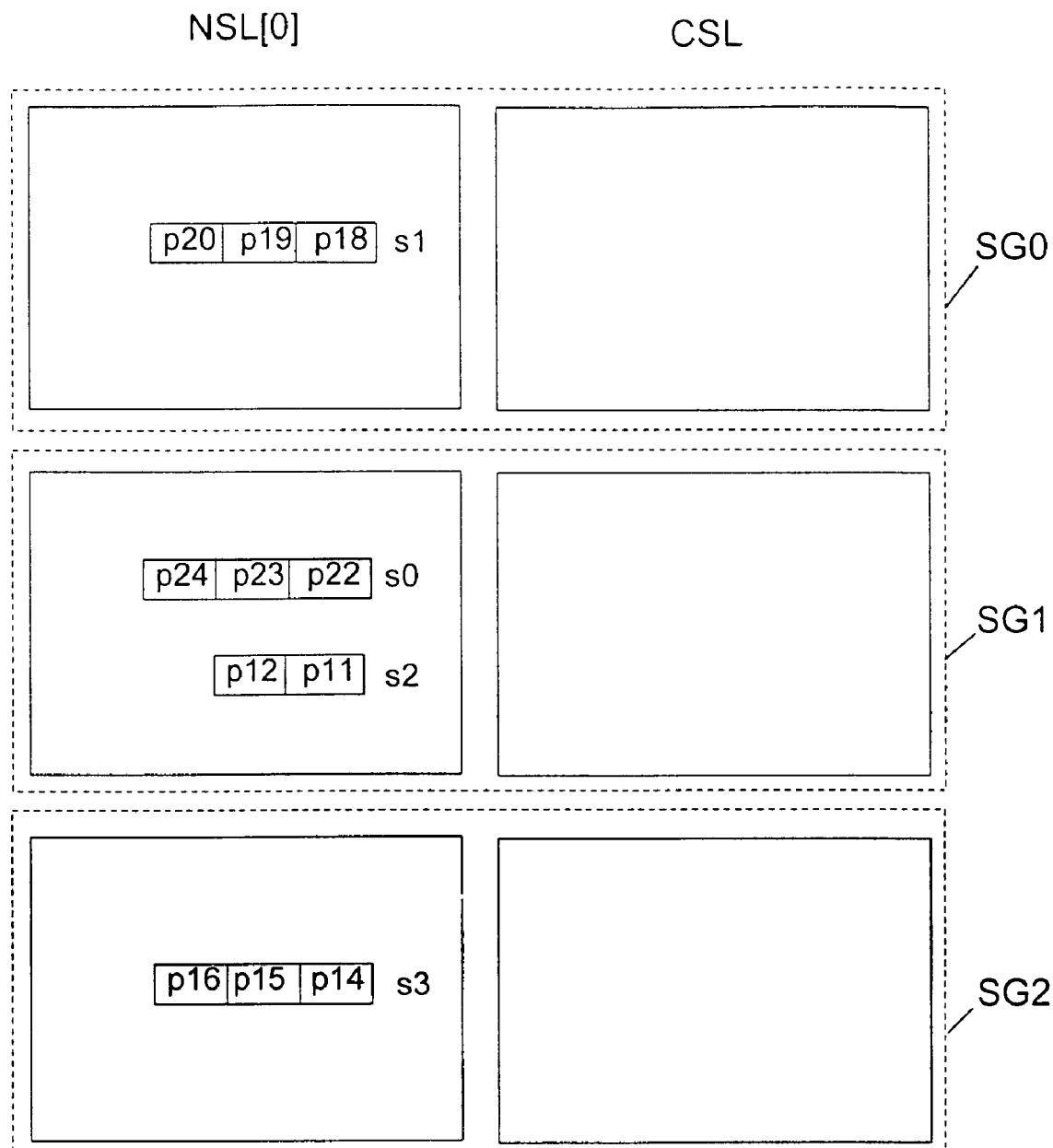

Session s0 is enqueued in NSL[0] of SG1. The result is shown in FIG. 16.

/ procedure updateVTwithVTF( ) /
VT is updated with VTF:
  g=0; SG0 is the first group with non-empty CSL or NSL[0];
  VTg=($\lfloor 11*2^{-0} \rfloor$+1)*$2^0$=12
  $\lfloor$VT+VTF$\rfloor$=$\lfloor 11+1 \rfloor$=12
  lastg=2
  newVT=12
  VTF=1−(12−11)=0
  VT=12
For SG0: NSL(SG0)[0] is transferred to CSL(SG0); NSL(SG0)[0] is emptied
For SG1: NSL(SG1)[0] is transferred to CSL(SG1); NSL(SG1)[0] is emptied
For SG2: NSL(SG2)[0] is transferred to CSL(SG2); NSL(SG2)[0] is emptied.
The result is shown in FIG. 17.

Figure 17:
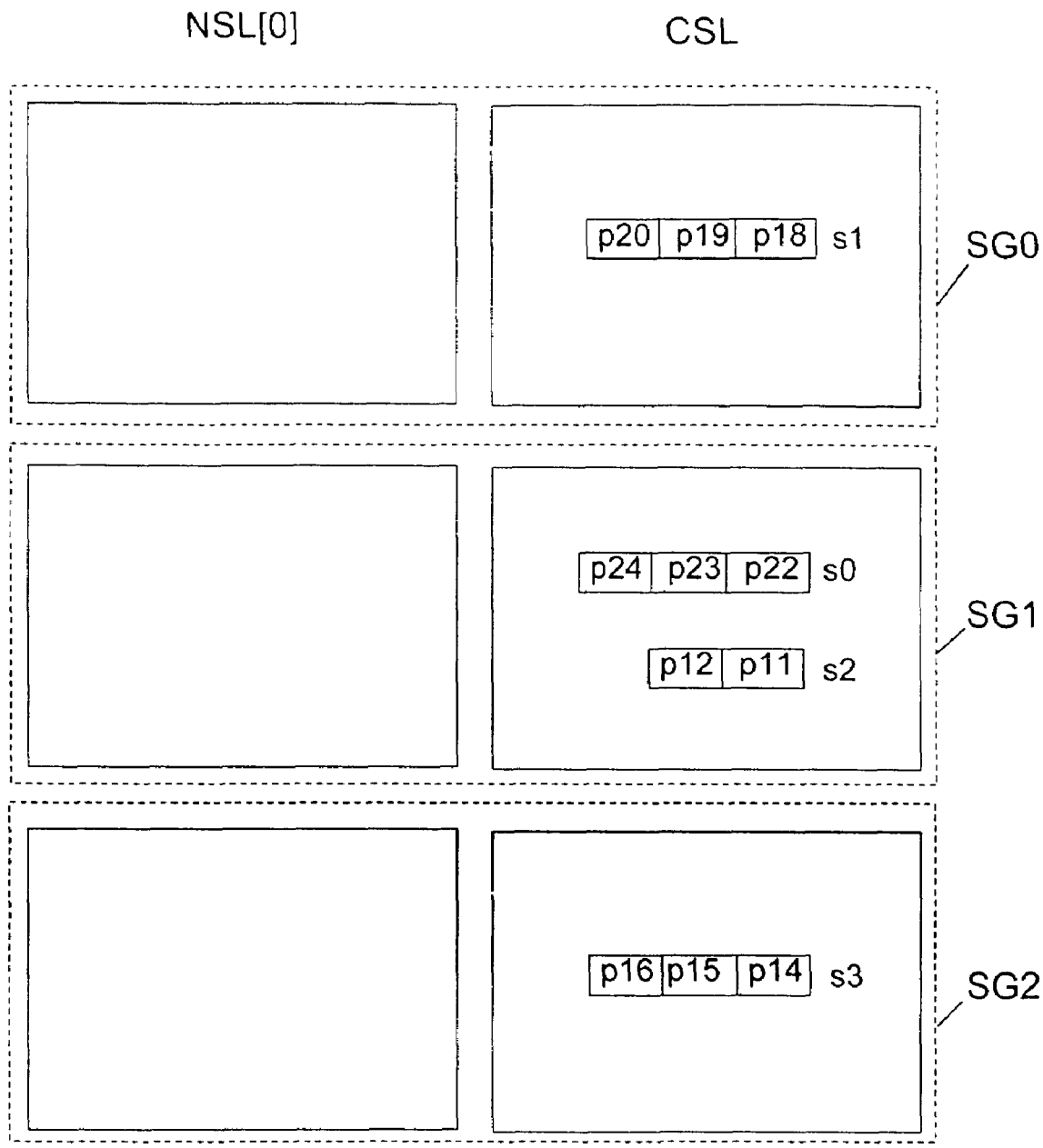

/ procedure scheduler /
The scheduler starts all over again, starting with the situation of FIG. 17.

The simulation may be continued the same way, by enqueueing data packets which arrive, and by scheduling, according to the present invention, data packets to be transmitted.

Figure 18:
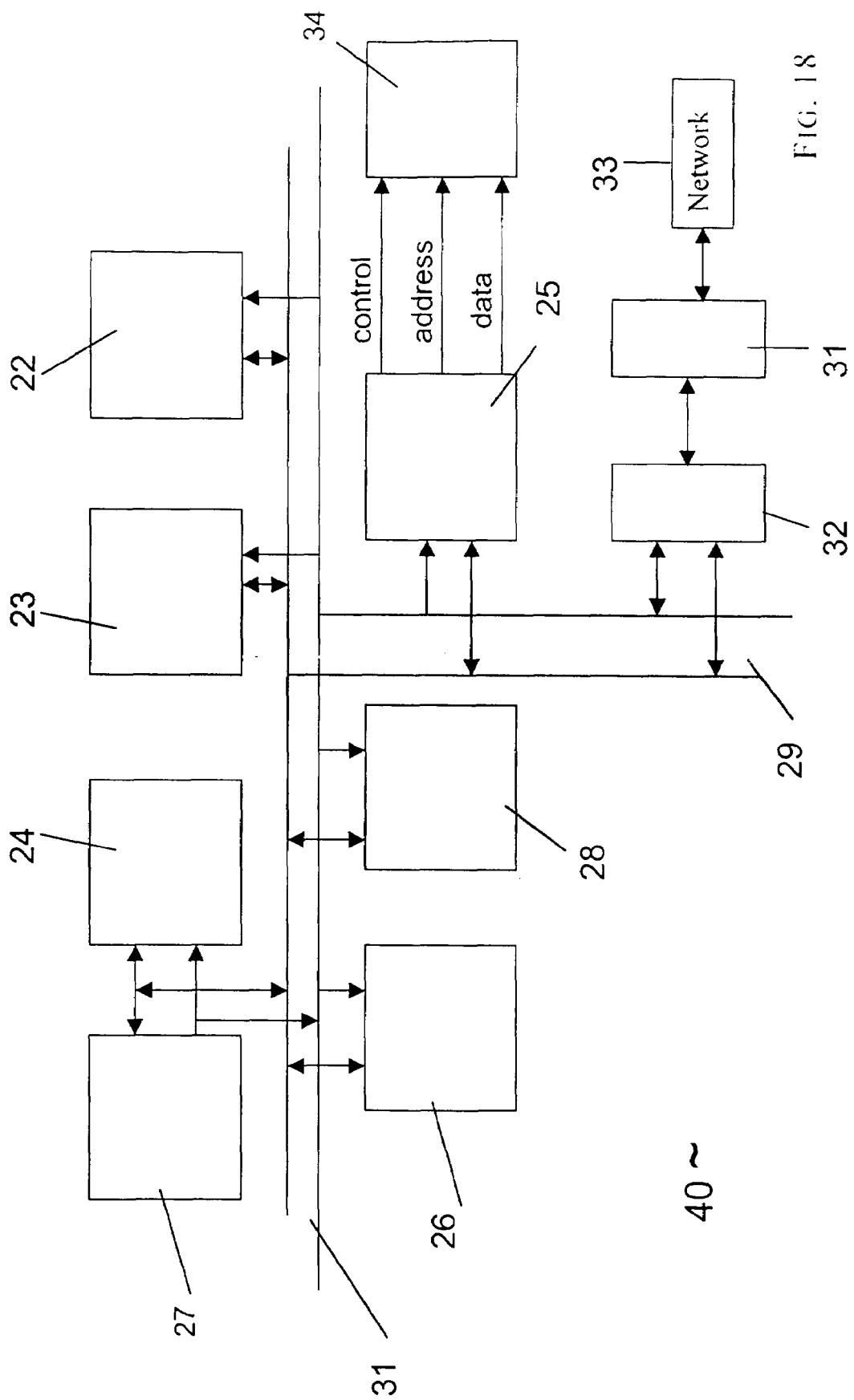
FIG. 18 is a schematic representation of an embodiment of the invention including an embedded processor and memory.

An example of a circuit in accordance with an embodiment of the present invention will be described with reference to FIG. 18 for a receiver/transmitter circuit 40. This circuit 40 may be constructed as a VLSI chip around an embedded microprocessor 27 such as an ARM7TDMI core designed by ARM Ltd., UK which may be synthesized onto a single chip with the other components shown. A zero wait state SRAM memory 22 may be provided on-chip as well as a cache memory 24. The SRAM memory 22 may be used for providing the various queues, registers and read and write queues described above. If on-chip memory is not large enough to store the packet data in the queues, alternative storage means may be used, e.g. off-chip memory 34. The interface to a packet switched network 33 is provided by block 31. Packet data received by block 31 is passed to the processor 27 for processing. An on-chip buffer 32 may be used to decouple the processor 27 from data transfer through the interface 31. A counter/timer block 28 may be provided as well as an interrupt controller 26. Software programs may be stored in an internal ROM (read only memory) 23. Access to the off-chip (e.g. DRAM) memory 34 may be provided through an external bus interface 25 with address, data and control busses. The various blocks of circuit 40 are linked by a suitable bus system 30 which is shown only schematically in the figure.

The session control mechanisms of the present invention may be implemented as software to run on processor 27. The procedures described above may be written as computer programs in a suitable computer language such as C and then compiled for the specific processor in the embedded design. For example, for the embedded ARM core VLSI described above the software may be written in C and then compiled using the ARM C compiler and the ARM assembler.

Accordingly, the present invention also includes software computer program products for carrying out any of the methods of the present invention when run on a suitable processing engine as well as data carriers for storing executable computer programs for carrying out any of the methods of the present invention. However, it is important that those skilled in the art will appreciate that the mechanisms and methods of the present invention are capable of being distributed as a program product in a variety of forms, and that the present invention applies equally regardless of the particular type of signal bearing media used to actually carry out the distribution. Examples of computer readable signal bearing media include: recordable type media such as floppy disks and CD ROMs and transmission type media such as digital and analogue communication links.

Figure 19:
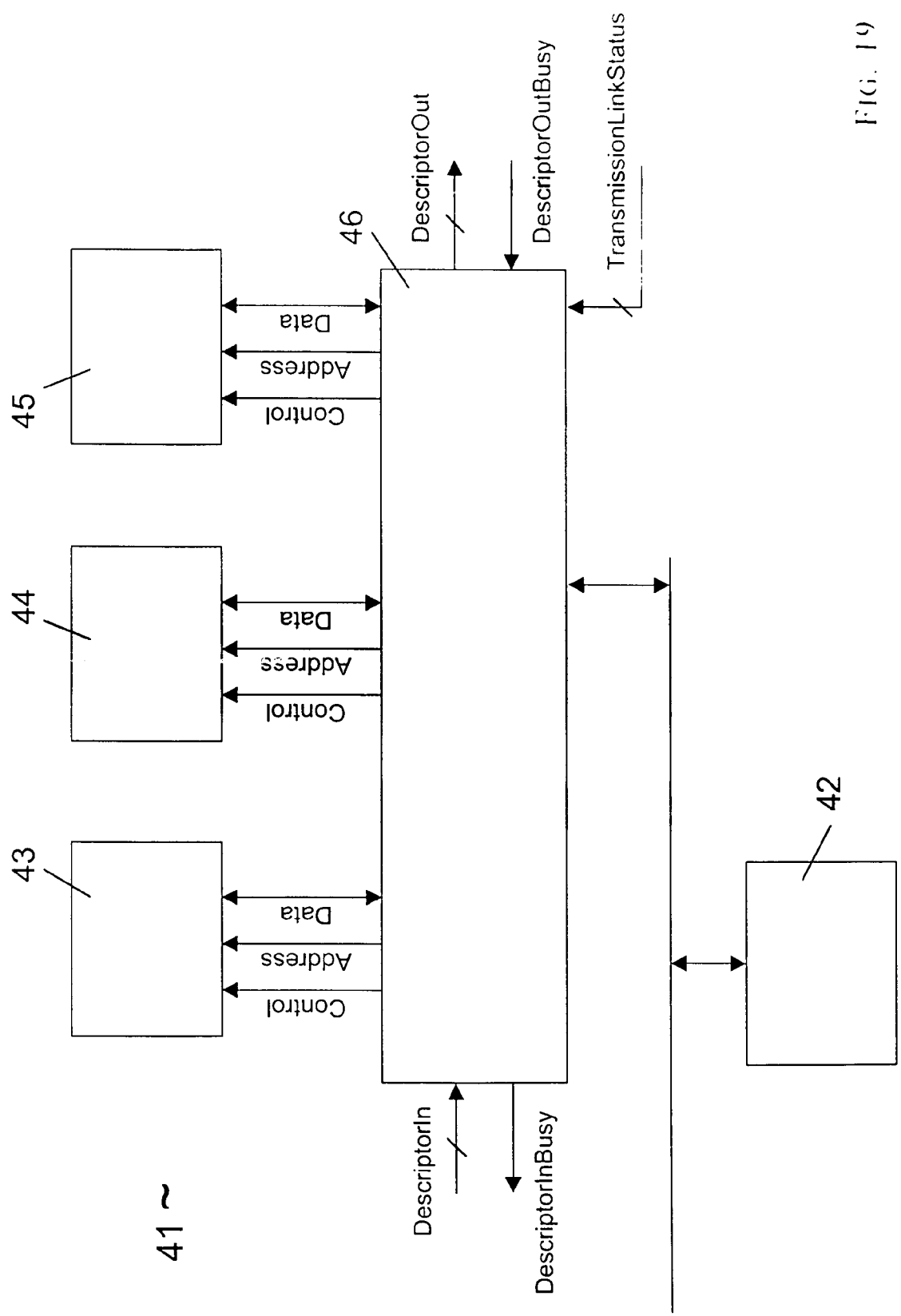
FIG. 19 is a schematic representation of an embodiment of the present invention including digital logic and memories.

Another example of a circuit in accordance with an embodiment of the present invention will be described with reference to FIG. 19 for a scheduling circuit 41. This circuit 41 may be constructed as part of VLSI chip handling the traffic management function for one or more transmission lines in a network node. The scheduling logic 46 receives packet descriptor information from a different part of the VLSI using a bus signal Descriptorin. This descriptor information contains packet size, session number, destination transmission line and other information describing the packet such as the location of the buffers that hold the packet data. The circuit may indicate that it is ready to receive new descriptors using a hand shake signal DescriptorInBusy, if necessary. Scheduling decisions are indicated by transmitting the descriptor of the packet that is sent out through the bus signal DescriptorOut. The scheduling logic 46 uses memory 43 to store and retrieve the descriptors together with session-queue next-pointers, memory 44 to store and retrieve session information and session-list next-pointers, and memory 45 to store and retrieve service-group information. These memories could be stored on-chip or off-chip. If some of these memories are also used by other functions on the chip, then an arbiter could be employed to arbitrate the requests from these various functional units.

The scheduling logic, that is formulated in the algorithmic description above, is implemented using a hardware design language such as VHDL or Verilog. The scheduling logic could perform the scheduling for multiple transmission lines, in which case memory 45 holds for each transmission line a distinct set of service-group information. The scheduler uses information that describes whether a particular link is idle or busy, TransmissionLinkStatus, to decide if and for what link it must schedule a packet.

The scheduler is configured by an embedded or off-chip host processor 42 to which it communicates using a system bus.

Those skilled in the art will appreciate that the hardware represented in FIG. 21 may vary for specific applications.

There have been described and illustrated herein several embodiments of a method and apparatus for fair queueing of data packets. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

The invention claimed is:

1. A packet scheduling apparatus, comprising:
an input device for receiving incoming data packets belonging to at least one session;
a bank of memories comprising memory sets for storing the incoming data packets, the memory sets having a nominal service-interval in which time a data packet is to be transmitted, the nominal service-interval of one memory set being faster than the nominal service-interval of another memory set;
an output device for transmitting the stored data packets;
a processing element linked to the input device, the output device and the bank of memories for scheduling sessions for being serviced until the nominal service-interval of any other of the memory sets where there is at least one data packet to be sent, is exceeded;
a timing unit for measuring the service-interval in accordance with virtual time, which virtual time is incremented in accordance with the time for transmission of the latest packet sent;
each memory set having a current session list memory and at least one new session list memory for holding data packets;
input means for inputting arriving data packets into the memory sets, data packets having a required service-interval;
a timing unit for holding a virtual time value;
means for swapping the content of the new session list memories into the current session list memories at integer values of the virtual time value, for memory sets which may receive service at that virtual time value, if the current session list memory for that memory set is empty, and a MissedSwaps counter for that memory set to be increased if the current session list memory for that memory set was not empty;
means for transmitting data packet from a current session list memory; and
a scheduler for scheduling transmission of a next data packet from that memory set based on the required service-interval of the previous data packet and a service interval it was actually given, and on the value of the MissedSwaps counter.

2. A packet scheduling method comprising:
enqueuing incoming data packets in sessions;
storing the sessions in sequential order in service-groups, each service-group being assigned a nominal service-interval in which time a data packet is to be transmitted, the nominal service-interval of one service-group being faster than the nominal service-interval of another service-group, each service-group comprising a current session list and at least one new session list;
within one service-group, servicing one session until the nominal service-interval of any other of the service-groups where there is at least one data packet to be sent is exceeded;
holding a virtual time value;
in at least one of the service-groups, holding at least one session having at least a head-of-session data packet, the session requiring a required service-interval for its head-of-session data packet, sessions requiring different service-intervals for their head-of-session data packets being held in different service-groups;
at integer values of the virtual time value, swapping the new session lists into the current session lists for service-groups which may receive service at that virtual time value, if the current session list for that service-group is empty, and increasing a MissedSwaps counter for that service-group if the current session list for that service-group was not empty;
transmitting the head-of-session data packet from a session in a current session list,
scheduling transmission of the next data packet from that session based on the required service-interval of the previous data packet and a service interval it was actually given, and on the value; of the MissedSwaps counter;
increasing the virtual time value and repeating the transmitting and increasing steps as long as the virtual time does not reach a next integer value, otherwise repeating the swapping step.

3. A packet scheduling apparatus, comprising:
an input device for receiving incoming data packets belonging to at least one session;
a bank of memories comprising memory sets for storing the incoming data packets, the memory sets having a nominal service-interval in which time a data packet is to be transmitted, the nominal service-interval of one memory set being faster than the nominal service-interval of another memory set, each memory set having a current session list memory and at least one new session list memory for holding data packets;
an output device for transmitting the stored data packets;
a processing element linked to the input device, the output device and the bank of memories for scheduling sessions for being serviced until the nominal service-interval of any other of the memory sets where there is at least one data packet to be sent, is exceeded;

input means for inputting arriving data packets into the memory sets, data packets having a required service-interval;

a timing unit for holding a virtual time value;

means for swapping the content of the new session list memories into the current session list memories at integer values of the virtual time value, for memory sets which may receive service at that virtual time value, if the current session list memory for that memory set is empty, and a MissedSwaps counter for that memory set to be increased if the current session list memory for that memory set was not empty;

means for transmitting data packet from a current session list memory; and a scheduler for scheduling transmission of a next data packet from that memory set based on the required service-interval of the next data packet to be sent, and on the value of the MissedSwaps counter.

4. A packet scheduling apparatus according to claim 3, further comprising:

a timing unit for measuring the service-interval in accordance with virtual time, which virtual time is incremented in accordance with the time expected for transmission of the next packet to be sent.

* * * * *